(12) United States Patent
Ahmad et al.

(10) Patent No.: US 11,681,922 B2
(45) Date of Patent: Jun. 20, 2023

(54) PERFORMING INFERENCE AND TRAINING USING SPARSE NEURAL NETWORK

(71) Applicant: Numenta, Inc., Redwood City, CA (US)

(72) Inventors: Subutai Ahmad, Palo Alto, CA (US); Luiz Scheinkman, Sunnyvale, CA (US)

(73) Assignee: Numenta, Inc., Redwood City, CA (US)

( * ) Notice: Subject to any disclaimer, the term of this patent is extended or adjusted under 35 U.S.C. 154(b) by 762 days.

(21) Appl. No.: 16/696,991

(22) Filed: Nov. 26, 2019

(65) Prior Publication Data
US 2021/0158168 A1    May 27, 2021

(51) Int. Cl.
*G06N 3/084* (2023.01)
*G06N 3/04* (2023.01)

(52) U.S. Cl.
CPC ............... *G06N 3/084* (2013.01); *G06N 3/04* (2013.01)

(58) Field of Classification Search
CPC ........ G06N 3/084; G06N 3/04; G06N 3/0445; G06N 3/0454
See application file for complete search history.

(56) References Cited

U.S. PATENT DOCUMENTS

| | | |
|---|---|---|
| 4,766,534 A | 8/1988 | DeBenedictis |
| 4,845,744 A | 7/1989 | DeBenedictis |
| 5,113,507 A | 5/1992 | Jaeckel |
| 5,255,348 A | 10/1993 | Nenov |
| 5,712,953 A | 1/1998 | Langs |
| 5,729,661 A | 3/1998 | Keeler et al. |
| 5,761,389 A | 6/1998 | Maeda et al. |
| 6,028,608 A | 2/2000 | Jenkins |
| 6,122,014 A | 9/2000 | Panusopone et al. |
| 6,144,711 A | 11/2000 | Raleigh et al. |
| 6,195,622 B1 | 2/2001 | Altschuler et al. |

(Continued)

FOREIGN PATENT DOCUMENTS

| | | | | |
|---|---|---|---|---|
| CN | 1303371 A | * | 7/2001 | ........... C07D 209/10 |
| EP | 1 557 990 | | 7/2005 | |

(Continued)

OTHER PUBLICATIONS

Adelson, E.H. et al., "The Perception of Shading and Reflectance," Perception as Bayesian Inference, 1996, pp. 409-423, Knill, D.C. et al., eds., Cambridge University Press, UK.

(Continued)

*Primary Examiner* — Charles T Shedrick
(74) *Attorney, Agent, or Firm* — WTA Patents

(57) ABSTRACT

An inference system trains and performs inference using a sparse neural network. The sparse neural network may include one or more layers, and each layer may be associated with a set of sparse weights that represent sparse connections between nodes of a layer and nodes of a previous layer. A layer output may be generated by applying the set of sparse weights associated with the layer to the layer output of a previous layer. Moreover, the one or more layers of the sparse neural network may generate sparse layer outputs. By using sparse representations of weights and layer outputs, robustness and stability of the neural network can be significantly improved, while maintaining competitive accuracy.

24 Claims, 12 Drawing Sheets

(56) References Cited

U.S. PATENT DOCUMENTS

| | | | |
|---|---|---|---|
| 6,400,996 B1 | 6/2002 | Hoffberg et al. | |
| 6,468,069 B2 | 10/2002 | Lemelson et al. | |
| 6,567,814 B1 | 5/2003 | Banker et al. | |
| 6,615,211 B2 | 9/2003 | Beygelzimer et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,957,241 B2 | 10/2005 | George | |
| 7,088,693 B2 | 8/2006 | George | |
| 7,251,637 B1 | 7/2007 | Caid et al. | |
| 7,308,134 B2 | 12/2007 | Wersing et al. | |
| 7,430,546 B1 | 9/2008 | Suri | |
| 7,613,675 B2 | 11/2009 | Hawkins et al. | |
| 7,620,608 B2 | 11/2009 | Jaros et al. | |
| 7,624,085 B2 | 11/2009 | Hawkins et al. | |
| 7,676,458 B2 | 3/2010 | Aggarwal et al. | |
| 7,739,208 B2 | 6/2010 | George et al. | |
| 7,778,946 B2 | 8/2010 | Hercus | |
| 7,826,990 B2 | 11/2010 | Nasle et al. | |
| 7,840,395 B2 | 11/2010 | Nasle et al. | |
| 7,840,396 B2 | 11/2010 | Radibratovic et al. | |
| 7,844,439 B2 | 11/2010 | Nasle et al. | |
| 7,844,440 B2 | 11/2010 | Nasle et al. | |
| 7,899,775 B2 | 3/2011 | George et al. | |
| 7,904,412 B2 | 3/2011 | Saphir et al. | |
| 7,937,342 B2 | 5/2011 | George et al. | |
| 7,941,389 B2 | 5/2011 | Marianetti et al. | |
| 7,941,392 B2 | 5/2011 | Saphir | |
| 7,958,280 B2 | 6/2011 | Salessi et al. | |
| 7,983,998 B2 | 7/2011 | George et al. | |
| 8,037,010 B2 | 10/2011 | Jaros et al. | |
| 8,081,209 B2 | 12/2011 | Ji et al. | |
| 8,102,423 B2 | 1/2012 | Cheng | |
| 8,103,603 B2 | 1/2012 | George et al. | |
| 8,112,367 B2 | 2/2012 | George et al. | |
| 8,121,961 B2 | 2/2012 | George et al. | |
| 8,175,981 B2 | 5/2012 | Hawkins et al. | |
| 8,175,984 B2 | 5/2012 | George | |
| 8,175,985 B2 | 5/2012 | Sayfan et al. | |
| 8,195,582 B2 | 6/2012 | Niemasik et al. | |
| 8,219,507 B2 | 7/2012 | Jaros et al. | |
| 8,285,667 B2 | 10/2012 | Jaros et al. | |
| 8,290,886 B2 | 10/2012 | George et al. | |
| 11,049,013 B1 * | 6/2021 | Duong | G06N 3/08 |
| 11,210,586 B1 * | 12/2021 | Duong | G06N 3/04 |
| 11,232,349 B2 * | 1/2022 | Busch | G06N 3/105 |
| 11,250,326 B1 * | 2/2022 | Ko | G06N 3/084 |
| 2002/0002688 A1 | 1/2002 | Gregg et al. | |
| 2002/0150044 A1 | 10/2002 | Wu et al. | |
| 2002/0161736 A1 | 10/2002 | Beygelzimer et al. | |
| 2003/0069002 A1 | 4/2003 | Hunter et al. | |
| 2003/0123732 A1 | 7/2003 | Miyazaki et al. | |
| 2003/0167111 A1 | 9/2003 | Kipersztok et al. | |
| 2004/0002838 A1 | 1/2004 | Oliver et al. | |
| 2004/0142325 A1 | 7/2004 | Mintz et al. | |
| 2004/0148520 A1 | 7/2004 | Talpade et al. | |
| 2004/0267395 A1 | 12/2004 | Discenzo et al. | |
| 2005/0002572 A1 | 1/2005 | Saptharishi et al. | |
| 2005/0028033 A1 | 2/2005 | Kipersztok et al. | |
| 2005/0063565 A1 | 3/2005 | Nagaoka et al. | |
| 2005/0190990 A1 | 9/2005 | Burt et al. | |
| 2005/0222811 A1 | 10/2005 | Jakobson et al. | |
| 2006/0093188 A1 | 5/2006 | Blake et al. | |
| 2006/0161736 A1 | 7/2006 | Huang | |
| 2006/0184462 A1 | 8/2006 | Hawkins | |
| 2006/0212444 A1 | 9/2006 | Handman et al. | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0253491 A1 | 11/2006 | Gokturk et al. | |
| 2006/0259163 A1 | 11/2006 | Hsiung et al. | |
| 2007/0005531 A1 | 1/2007 | George et al. | |
| 2007/0019754 A1 | 1/2007 | Raleigh et al. | |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0228703 A1 | 10/2007 | Breed | |
| 2007/0276744 A1 | 11/2007 | Burke | |
| 2007/0276774 A1 | 11/2007 | Ahmad et al. | |
| 2008/0059389 A1 | 3/2008 | Jaros et al. | |
| 2008/0140593 A1 | 6/2008 | George et al. | |
| 2008/0183647 A1 | 7/2008 | Hawkins et al. | |
| 2008/0201286 A1 | 8/2008 | Hawkins et al. | |
| 2008/0208783 A1 | 8/2008 | Jaros et al. | |
| 2008/0208915 A1 | 8/2008 | George et al. | |
| 2008/0208966 A1 | 8/2008 | Edwards et al. | |
| 2009/0006289 A1 | 1/2009 | Jaros et al. | |
| 2009/0116413 A1 | 5/2009 | George | |
| 2009/0150311 A1 | 6/2009 | George | |
| 2009/0240886 A1 | 9/2009 | Sayfan et al. | |
| 2009/0313193 A1 | 12/2009 | Hawkins et al. | |
| 2010/0049677 A1 | 2/2010 | Jaros et al. | |
| 2010/0185567 A1 | 7/2010 | Niemasik et al. | |
| 2010/0191684 A1 | 7/2010 | George | |
| 2010/0207754 A1 | 8/2010 | Shostak et al. | |
| 2010/0312730 A1 | 12/2010 | Weng et al. | |
| 2011/0047110 A1 | 2/2011 | Rinkus | |
| 2011/0231351 A1 | 9/2011 | George et al. | |
| 2012/0005134 A1 | 1/2012 | Jaros et al. | |
| 2012/0109857 A1 | 5/2012 | George et al. | |
| 2012/0166364 A1 | 6/2012 | Ahmad et al. | |
| 2012/0197823 A1 | 8/2012 | Hawkins et al. | |
| 2012/0330885 A1 | 12/2012 | Jaros et al. | |
| 2013/0054495 A1 | 2/2013 | Hawkins et al. | |
| 2013/0054494 A1 | 2/2013 | Marianetti et al. | |
| 2013/0054552 A1 | 2/2013 | Hawkins et al. | |
| 2015/0324689 A1 * | 11/2015 | Wierzynski | G06N 3/049 706/20 |
| 2016/0012314 A1 * | 1/2016 | Ramamurthy | G06F 18/28 382/160 |
| 2016/0174902 A1 * | 6/2016 | Georgescu | G16H 50/30 600/408 |
| 2016/0358070 A1 * | 12/2016 | Brothers | G06N 3/045 |
| 2017/0337472 A1 * | 11/2017 | Durdanovic | G06N 3/082 |
| 2019/0026600 A1 * | 1/2019 | Bagherinezhad | G06F 18/28 |
| 2019/0087713 A1 * | 3/2019 | Lamb | G06N 3/063 |
| 2019/0332925 A1 * | 10/2019 | Modha | G06N 3/045 |
| 2020/0143250 A1 * | 5/2020 | Lee | G06N 3/045 |
| 2020/0279133 A1 * | 9/2020 | Baum | G06N 5/046 |
| 2020/0285892 A1 * | 9/2020 | Baum | G06F 9/30069 |
| 2020/0285949 A1 * | 9/2020 | Baum | G06N 3/063 |
| 2020/0285950 A1 * | 9/2020 | Baum | G06F 8/4434 |
| 2020/0301995 A1 * | 9/2020 | Shibata | G06F 17/16 |
| 2020/0327406 A1 * | 10/2020 | Piveteau | G06N 3/084 |
| 2021/0065005 A1 * | 3/2021 | Zhu | G06N 3/048 |
| 2021/0150363 A1 * | 5/2021 | Yang | G06N 3/045 |
| 2021/0158168 A1 * | 5/2021 | Ahmad | G06N 3/04 |
| 2022/0044090 A1 * | 2/2022 | Yoo | G06F 7/483 |
| 2022/0075437 A1 * | 3/2022 | Han | G06F 1/3212 |

FOREIGN PATENT DOCUMENTS

| | | | | |
|---|---|---|---|---|
| EP | 3657403 A1 * | 5/2020 | | G06F 1/3296 |
| GB | 2399427 A * | 9/2004 | | G06F 17/30719 |
| WO | WO 2009/006231 | 6/2006 | | |
| WO | WO 2008/067326 | 6/2008 | | |
| WO | WO 2006/063291 | 1/2009 | | |

OTHER PUBLICATIONS

Agrawal, R. et al., "Mining Sequential Patterns," IEEE, 1995, pp. 3-14.

Ahmad, S. et al., "How do neurons operate on sparse distributed representations? A mathematical theory of sparsity, neurons and active dendrites," arXiv:1601.00720, Jan. 5, 2016, pp. 1-17.

Ahmad, S. et al., "PowerNuPIC," Numenta, Jun. 2008, Numenta HTM Workshop, Jun. 23-24, 2008, SRI Campus, Menlo Park, CA, fifty-six pages.

(56) References Cited

OTHER PUBLICATIONS

Ahmad, S. et al., "How Can We Be So Dense? The Robustness of Highly Sparse Representations," ICML 2019 Workshop on Uncertainty and Robustness in Deep Learning, Jun. 2019, pp. 1-10.

Ahmad, S., "NuPIC Jumpstart—Part II," Numenta, May 2008, Numenta HTM Workshop, Jun. 23-24, 2008, SRI Campus, Menlo Park, CA, thirty-three pages.

Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008. Retrieved from the Internet<URL:http://web.archive.org/web/20070319232606/http://www.nume-nta.com/for-developers/softare/pdf/nupic_prog_guide.pdf>.

Åslin, F., "Evaluation of Hierarchical Temporal Memory in Algorithmic Trading," Thesis, Linkopings Universitet, Feb. 8, 2010, 37 pages.

Becerra, J.A. et al., "Multimodule Artificial Neural Network Architectures for Autonomous Robot Control Through Behavior Modulation," IWANN 2003, LNCS, pp. 169-176, vol. 2687.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.

Bobier, B., "Content-Based Image Retrieval Using Hierarchical Temporal Memory," Numenta HTM Workshop, Jun. 23-24, 2008, SRI Campus, Menlo Park, CA, seven pages.

Bradski, G. et al., "Fast-Learning VIEWNET Architectures for Recognizing Three-dimensional Objects from Multiple Two-dimensional Views," Neural Networks, 1995, pp. 1053-1080, vol. 8, No. 7/8.

Bryhni et al., "A Comparison of Load Balancing Ttechniques for Scalable Web Servers," IEEE Network, Jul./Aug. 2000, pp. 58-64.

Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.

Chapela, V., "Preventing Financial Fraud," Smart Security Services, Numenta HTM Workshop, 2009, forty pages.

Chen, Y. et al., "The Sparse Manifold Transform," 32nd Conference on Neural Information Processing Systems (NeurIPS 2018), Dec. 2018, pp. 1-12.

Chinese Office Action, Chinese Application No. 200580042258.7, dated Jul. 10, 2009, twelve pages.

Chinese Office Action, Chinese Application No. 200780007274.1, dated Jun. 24, 2011, five pages.

Colombe, J., "A Survey of Recent Developments in Theoretical Neuroscience and Machine Vision," Proceedings of the IEEE Applied Imagery Pattern Recognition Workshop, 2003, nine pages.

Cormack, G.V. et al., "Data Compression Using Dynamic Markov Modelling," The Computer Journal, 1987, pp. 541-550, vol. 30, No. 6.

Csapo, A.B. et al., "Object Categorization Using VFA-Generated Nodemaps and Hierarchical Temporal Memories," IEEE International Conference on Computational Cybernetics, Oct. 7, 2007, pp. 257-262.

Cui, Y. et al., "The HTM Spatial Pooler—A Neocortical Algorithm for Online Sparse Distributed Coding," Frontiers in Computational Neuroscience, vol. 11, Article 111, Nov. 2017, pp. 1-15.

Curry, C. et al., "Speech Processing with HTM," Numenta HTM Workshop, Jun. 23-24, 2008, SRI Campus, Menlo Park, CA, fifty-seven pages.

Dean, T., "Learning Invariant Features Using Inertial Priors," Annals of Mathematics and Artificial Intelligence, 2006, pp. 223-250, vol. 47.

Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.

Dimitrova, N. et al., "Motion Recovery for Video Content Classification," ACM Transactions on Information Systems, Oct. 1995, pp. 408-439, vol. 13, No. 4.

Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.

Dolin, R. et al., "Scalable Collection Summarization and Selection," Association for Computing Machinery, 1999, pp. 49-58.

Dubinsky, D., "Numenta Business Strategy," Numenta, Jun. 2008, Numenta HTM Workshop, Jun. 23-24, 2008, SRI Campus, Menlo Park, CA, fifteen pages.

Dudgeon, M. et al., "Evolved HTM Preprocessing," Qualia Labs, Jun. 25, 2009, nine pages.

Eastman, K. "HTM's & Airline Passenger Behavior: Prediction and Inference Model," Numenta HTM Workshop, 2009, ten pages.

Edsa, "Project Information," Apr. 2008, Numenta HTM Workshop, Jun. 23-24, 2008, SRI Campus, Menlo Park, CA, four pages.

Eswaran, K., "Numenta Lightning Talk on Dimension Reduction and Unsupervised Learning," Numenta HTM Workshop, Jun. 23-24, 2008, SRI Campus, Menlo Park, CA, thirty pages.

European Examination Report, European Application No. 11756775.0, dated Feb. 19, 2016, 6 pages.

European Examination Report, European Application No. 11756775.0, dated Oct. 12, 2016, 4 pages.

European Patent Office, Examination Report European Patent Application No. 07750385.2, dated Dec. 6, 2010, eight pages.

European Patent Office, Examination Report, European Application No. 05853611.1, dated Jun. 23, 2008, four pages.

European Patent Office, Examination Report, European Application No. 07750385.2, dated Apr. 21, 2009, eight pages.

European Patent Office, Examination Report, European Patent Application No. 08796030.8, dated Dec. 6, 2010, seven pages.

European Patent Office, Examination Report, European Patent Application No. 11756775.0, dated Jan. 7, 2015, eight pages.

European Patent Office, Supplementary European Search Report and Opinion, European Patent Application No. 11756775.0, dated Oct. 1, 2013, eight pages.

Fan et al., "A Genetic Sparse Distributed Memory Approach to the Application of Handwritten Character Recognition," published 1997.

Farahmand, N. et al., "Online Temporal Pattern Learning," Proceedings of the International Joint Conference on Neural Networks, Jun. 14-19, 2009, pp. 797-802, Atlanta, GA, USA.

Felleman, D.J. et al., "Distributed Hierarchical Processing in the Primate Cerebral Cortex," Cerebral Cortex, Jan./Feb. 1991, pp. 1-47, vol. 1.

Fine, S. et al., "The Hierarchical Hidden Markov Model: Analysis and Applications," Machine Learning, 1998, pp. 41-62, vol. 32, Kluwer Academic Publishers, Boston.

Finley, M., "Exploration of Motion Capture," Qualia Labs, Jun. 24, 2008, Numenta HTM Workshop, Jun. 23-24, 2008, SRI Campus, Menlo Park, CA, thirty-six pages.

Foldiak, P., "Learning Invariance from Transformation Sequences," Neural Computation, 1991, pp. 194-200, vol. 3, No. 2.

Fukushima, K., "Neocognitron: A Self-Organizing Neural Network Model for a Mechanism of Pattern Recognition Unaffected by Shift in Position," Biol. Cybernetics, 1980, pp. 193-202, vol. 36.

Garalevicius, S., "Memory-Prediction Framework for Pattern Recognition: Performance and Suitability of the Bayesian Model of Visual Cortex," American Association of Artificial Intelligence, 2007, six pages.

George, D. "Thesis: How the Brain Might Work," Dept. of Electrical Engineering and the Committee on Graduate Studies of Stanford University, Jun. 2008, one-hundred ninety-one pages.

George, D. et al., "A Hierarchical Bayesian Model of Invariant Pattern Recognition in the Visual Cortex," Proceedings, 2005 IEEE International Joint Conference on Neural Networks, Jul. 31-Aug. 4, 2005, pp. 1812-1817, vol. 3.

George, D. et al., "Invariant Pattern Recognition Using Bayesian Inference on Hierarchical Sequences," Technical Report, Sep. 17, 2004, pp. 1-8.

(56) References Cited

OTHER PUBLICATIONS

George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.
George, D. et al., "Towards a Mathematical Theory of Cortical Micro-circuits," PLoS Computational Biology, Oct. 2009, vol. 5, Issue 10, twenty-six pages.
Gottschalk, K. et al., "Introduction to Web Services Architecture," IBM Systems Journal, 2002, pp. 170-177, vol. 41, No. 2.
Gripon, V. et al., "Sparse Neural Networks with Large Learning Diversity," IEEE Transactions on Neural Networks, Jul. 2011, pp. 1087-1096, vol. 22, No. 7.
Guerrier, P., "A Generic Architecture for On-Chip Packet-Switched Interconnections," Association for Computing Machinery, 2000, pp. 250-256.
Guinea, D. et al., "Robot Learning to Walk: An Architectural Problem for Intelligent Controllers," Proceedings of the 1993 International Symposium on Intelligent Control, Aug. 1993, pp. 493-498, Chicago, USA.
Guo, C-E. et al., "Modeling Visual Patterns by Integrating Descriptive and Generative Methods," International Journal of Computer Vision, May 29, 2003, pp. 5-29, vol. 53, No. 1.
Haitani, R. et al., "Vitamin D Toolkit, Introduction," Jun. 24, 2008, Numenta HTM Workshop, Jun. 23-24, 2008, SRI Campus, Menlo Park, CA, eleven pages.
Haitani, R., "Smart Video: A Disruptive Market Opportunity for HTM," Numenta HTM Workshop, 2009, twelve pages.
Han, K. et al., "Automated Robot Behavior Recognition Applied to Robotic Soccer," in Proceedings of the IJCAI-99 Workshop on Team Behaviors and Plan Recognition, 1999, six pages.
Haritaoglu, I. et al., "W4: Real-Time Surveillance of People and Their Activities," IEEE Transactions on Pattern Analysis and Machine Intelligence, Aug. 2000, pp. 809-830, vol. 22, No. 8.
Hartung, J. et al., "Presentation: Support for the Use of Hierarchical Temporal Memory Systems in Automated Design Evaluation: A First Experiment," Numenta HTM Workshop, 2009, thrity-one pages.
Hartung, J. et al., "Support for the Use of Hierarchical Temporal Memory Systems in Automated Design Evaluation: A First Experiment," Proceedings of the ASME 2009 Int'l. Design Engineering Technical Conferences & Computers and Information in Engineering Conference, Aug. 30-Sep. 2, 2009, ten pages, San Diego, CA, USA.
Hasegawa, Y. et al., "Learning Method for Hierarchical Behavior Controller," Proceedings of the 1999 IEEE International Conference on Robotics & Automation, May 1999, pp. 2799-2804.
Hawkins, J. "Hierarchical Temporal Memory: History-Progress-Today-Tomorrow," HTM Workshop, Jun. 2009, twenty-four pages.
Hawkins, J. "Prediction Toolkit Overview," Numenta HTM Workshop, 2009, four pages.
Hawkins, J. et al., "Hierarchical Temporal Memory including HTM Cortical Learning Algorithms," Numenta, Inc., Sep. 12, 2011, pp. 1-68.
Hawkins, J. et al., "Hierarchical Temporal Memory, Concepts, Theory, and Terminology," Numenta, May 10, 2006, pp. 1-19.
Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.
Hawkins, J. et al., "On Intelligence," Sep. 2004, Times Books, Henry Holt and Company, New York, NY 10011.
Hawkins, J. et al., "Sequence Memory for Prediction, Inference and Behaviour," Philosophical Transactions of the Royal Society B, Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full-.pdf.>.
Hawkins, J., "Why Can't a Computer Be More Like a Brain?" IEEE Spectrum, Apr. 1, 2007, pp. 21-26, vol. 44, No. 4.
He, K. et al., "Deep Residual Learning for Image Recognition," arXiv:1512.03385, Dec. 10, 2015, pp. 1-12.
He, K. et al., "Delving Deep into Rectifiers: Surpassing Human-Level Performance on ImageNet Classification," arXiv:1502.01852, Feb. 6, 2015, pp. 1-11.
Hendrycks, D. et al., "Benchmarking Neural Network Robustness to Common Corruptions and Surface Variations," arXiv:1807.01697, Jul. 4, 2018, pp.
Hernandez-Gardiol, N. et al., "Hierarchical Memory-Based Reinforcement Learning," Proceedings of Neural Information Processing Systems, 2001, seven pages.
Hinton, G.E. et al., "The "Wake-Sleep" Algorithm for Unsupervised Neural Networks," Science, May 26, 1995, pp. 1158-1161, vol. 268.
Hoey, "Hierarchical unsupervised learning of facial expression categories," IEEE, 2001, 0-7695-1293-3, pp. 99-106.
Howard, M. W., "Memory as Perception of the Past: Compressed Time inMind and Brain," Trends in Cognitive Sciences, vol. 22, Iss. 2, Feb. 1, 2018, pp. 124-136.
Huang, G. et al., "Densely Connected Convolutional Networks," arXiv:1608.06993, Aug. 25, 2016, pp. 1-12.
Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.
Ioffe, S. et al., "Batch Normalization: Accelerating Deep Network Training by Reducing Internal Covariate Shift," arXiv:1502.03167, Feb. 11, 2015, pp. 1-10.
Isard, M. et al., "Icondensation: Unifying Low-Level and High-Level Tracking in a Stochastic Framework," Lecture Notes in Computer Science 1406, 1998, pp. 893-908, Burkhardt, H. et al., ed., Springer-Verlag, Berlin.
Kanerva, P., Chapter 9: Constructing Distributed Memory and Chapter 10: The Organization of an Autonomous Learning System, Sparse Distributed Memory, The MIT Press, Cambridge, MA, 1988, pp. 87-100.
Kim, J. et al., "Hierarchical Distributed Genetic Algorithms: A Fuzzy Logic Controller Design Application," IEEE Expert, Jun. 1996, pp. 76-84.
Kuenzer, A. et al., "An Empirical Study of Dynamic Bayesian Networks for User Modeling," Proceedings of the UM 2001 Workshop on Machine Learning, ten pages.
Lecun, Y. et al., "Backpropagation Applied to Handwritten Zip Code Recognition," Neural Computation, vol. 1, Issue 4, Winter 1989, pp. 541-551.
Lecun, Y. et al., "Gradient-Based Learning Applied to Document Recognition," Proc. of the IEEE, Nov. 1998, pp. 1-46.
Lee, H. et al., "Convolutional Deep Belief Networks for Scalable Unsupervised Learning of Hierarchical Representations," Proceedings of the 26th International Conference on Machine Learning, Jun. 2009, pp. 609-616.
Lee, H. et al., "Sparse deep belief net model for visual area V2," Advances In Neural Information Processing Systems, Dec. 2008, pp. 1-8.
Lee, T.S. et al., "Hierarchical Bayesian Inference in the Visual Cortex," J. Opt. Soc. Am. A. Opt. Image. Sci. Vis., Jul. 2003, pp. 1434-1448, vol. 20, No. 7.
Lenser, S. et al., "A Modular Hierarchical Behavior-Based Architecture," RoboCup 2001, LNAI 2377, 2002, pp. 423-428, Birk, A. et al., (eds.), Springer-Verlag, Berlin, Heidelberg.
Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.
Lewicki, M.S. et al., "Bayesian Unsupervised Learning of Higher Order Structure," Proceedings of the 1996 Conference in Advances in Neural Information Processing Systems 9, pp. 529-535.
Lim, "Estimation of Occlusion and Dense Motion Fields in a Bidirectional Bayesian Framework," IEEE Transactions on Pattern Analysis and Machine Intelligence, 2002, pp. 712-718, vol. 24, No. 5.
Lo, J. "Unsupervised Hebbian Learning by Recurrent Multilayer Neural Networks for Temporal Hierarchical Pattern Recognition," Information Sciences and Systems 44th Annual Conference on Digital Object Identifier, 2010, pp. 1-6.

(56) References Cited

OTHER PUBLICATIONS

Mahadevan, S. et al., "Validation of reliability computational models using Bayes networks," Reliability Engineering & System Safety, 2005, pp. 223-232, vol. 87.
Majani, E. et al., "On the K-Winners-Take-All Network," Advances in Neural Information Processing Systems 1 (NIPS 1988), Dec. 1988, pp. 634-642.
Majure, L., "Unsupervised Phoneme Acquisition Using HTM," Jun. 25, 2009, eight pages.
Makhzani, A. et al., "k-Sparse Autoencoders," arXiv:1312.5663, Dec. 19, 2013, pp. 1-9.
Makhzani, A. et al., "Winner-Take-All Autoencoders," Advances in Neural Information Processing Systems 28 (NIPS 2015), Dec. 2015, pp. 1-9.
Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.
Mari, J.-F. et al., "Temporal and Spatial Data Mining with Second-Order Hidden Markov Models," Soft Computing—A Fusion of Foundations, Methodologies and Applications, 2006, pp. 406-414, vol. 10, No. 5.
McDowell, C. et al., "SlugGo, a Computer Go Program," Numenta HTM Workshop, Jun. 23-24, 2008, SRI Campus, Menlo Park, CA, eighteen pages.
Miller, J. W. et al., "Biomimetic Sensory Abstraction Using Hierarchical Quilted Self-Organizing Maps," Society of Photo-Optical Instrumentation Engineers, 2006, eleven pages.
Mishkin, M. et al., "Hierarchical Organization of Cognitive Memory," Phil. Trans. R. Soc. B., 1997, pp. 1461-1467, London.
Mitrovic, A., "An Intelligent SQL Tutor on the Web," International Journal of Artificial Intelligence in Education, 2003, pp. 171-195, vol. 13.
Muckli, L., "Predictive Coding in Apparent Motion," University of Glasgow, Numenta HTM Workshop, Jun. 25, 2009, twelve pages.
Murphy, K. et al., "Using the Forest to See the Trees: A Graphical Model Relating Features, Objects and Scenes," Advances in Neural Processing System, 2004, vol. 16, eight pages.
Murray, S.O. et al., "Shape Perception Reduces Activity in Human Primary Visual Cortex," Proceedings of the Nat. Acad. of Sciences of the USA, Nov. 2002, pp. 15164-151169, vol. 99, No. 23.
Nair, D. et al., "Bayesian Recognition of Targets by Parts in Second Generation Forward Looking Infrared Images," Image and Vision Computing, 2000, pp. 849-864, vol. 18.
Nair, V. et al., "3D Object Recognition with Deep Belief Nets," Advances in Neural Information Processing Systems 22 (NIPS 2009), Dec. 2009, pp. 1-9.
Namphol, A. et al., "Image Compression with a Hierarchical Neural Network," IEEE transactions on Aerospace and Electronic Systems, Jan. 1996, pp. 326-338, vol. 32, No. 1.
Naphade, M. et al., "A Probabilistic Framework for Semantic Video Indexing, Filtering, and Retrieval," IEEE Transactions on Multimedia, Mar. 2001, pp. 141-151, vol. 3, No. 1.
Naphade, M. et al., "Discovering Recurrent Events in Video Using Unsupervised Methods," IEEE ICIP, 2002, pp. 11-13 through 11-16.
Niemasik, J. "Vision Toolkit," Numenta HTM Workshop, 2009, twenty-eight pages.
Numenta, Inc., "Business Strategy," Numenta HTM Workshop, 2009, fifteen pages.
Numenta, Inc., "Hierarchical Temporal Memory: Comparison with Existing Models, Version 1.01," Mar. 1, 2007, four pages.
Numenta, Inc., "HTM Algorithms," Jun. 2008, Numenta HTM Workshop, Jun. 23-24, 2008, SRI Campus, Menlo Park, CA, sixty-seven pages.
Numenta, Inc., "HTM Workshop, Jumpstart," Jun. 2008, Numenta HTM Workshop, Jun. 23-24, 2008, SRI Campus, Menlo Park, CA, eighty-six pages.
Numenta, Inc., "Numenta Node Algorithms Guide NuPIC 1.6," Numenta, Jul. 22, 2008, pp. 1-7.
Numenta, Inc., "Numenta Node Algorithms Guide NuPIC 1.6," Numenta, Jun. 13, 2008, pp. 1-6.
Numenta, Inc., "Numenta Platform for Intelligent Computing: Programmer's Guide Version 1.0," Mar. 2007, seventy-seven pages.
Numenta, Inc., "NuPIC Update," Numenta HTM Workshop, 2009, twenty-four pages.
Numenta, Inc., "Problem Solving with HTMs," Jun. 2008, Numenta HTM Workshop, Jun. 23-24, 2008, SRI Campus, Menlo Park, CA, twenty-three pages.
Numenta, Inc., "Prototype to Demonstrate Automated Insect Detection and Discrimination," Numenta HTM Workshop, 2009, four pages.
Numenta, Inc., "Smart Music: Combining Musical Expectations with Algorithmic Composition," Numenta HTM Workshop, 2009, seven pages.
Numenta, Inc., "Technical Keynote," Numenta HTM Workshop, 2009, seventy-two pages.
Numenta, Inc., "Temporal Model Characteristics," Numenta HTM Workshop, 2009, fourteen pages.
Numenta, Inc., "Vision Framework," Jun. 2008, Numenta HTM Workshop, Jun. 23-24, 2008, SRI Campus, Menlo Park, CA, thirty-six pages.
Numenta, Inc., "What Have We Worked on Since the 2008 Workshop? Customer Applications Presentation," Numenta HTM Workshop, 2009, thirty-five pages.
Numenta, Inc., "Zeta1 Algorithms Reference, Version 1.0," Numenta Inc., Mar. 1, 2007, pp. 1-36.
Numenta, Inc., "Zeta1 Algorithms Reference, Version 1.2," Numenta Inc., Jun. 8, 2007, pp. 1-38.
Numenta, Inc., "Zeta1 Algorithms Reference, Version 1.3," Numenta Inc., Aug. 22, 2007, pp. 1-41.
Numenta, Inc., "Zeta1 Algorithms Reference, Version 1.5," Numenta Inc., Aug. 24, 2007, pp. 1-45.
Olshausen, B. A. et al., "Sparse Coding with an Overcomplete Basis Set: A Strategy Employed by V1?," Vision Research, vol. 37, Iss. 23, Dec. 1997, pp. 3311-3325.
Olshausen, B.A. et al., "A Neurobiological Model of Visual Attention and Invariant Pattern Recognition Based on Dynamic Routing Information," Journal of Neuroscience, Nov. 1993, pp. 4700-4719, vol. 13, No. 11.
Park, S. et al., "Recognition of Two-person Interactions Using a Hierarchical Bayesian Network," ACM SIGMM International Workshop on Video Surveillance (IWVS) 2003, pp. 65-76, Berkeley, USA.
"Partial Transcript from Numenta HTM Workshop DVD Disc 1," Numenta, Jun. 2008, 6 pages.
PCT International Search Report and Written Opinion, PCT Application No. PCT/US07/85661, dated Jun. 13, 2008, eight pages.
PCT International Search Report and Written Opinion, PCT Application No. PCT/US08/55352, dated Aug. 1, 2008, nine pages.
PCT International Search Report and Written Opinion, PCT Application No. PCT/US08/55389, dated Jul. 25, 2008, nine pages.
PCT International Search Report and Written Opinion, PCT Application No. PCT/US2005/044729, dated May 14, 2007, 15 pages.
PCT International Search Report and Written Opinion, PCT Application No. PCT/US2007/003544, dated Jun. 16, 2008, 14 pages.
PCT International Search Report and Written Opinion, PCT Application No. PCT/US2008/054631, dated Aug. 18, 2008, 15 pages.
PCT International Search Report and Written Opinion, PCT Application No. PCT/US2008/068435, dated Oct. 31, 2008, 16 pages.
PCT International Search Report and Written Opinion, PCT Application No. PCT/US2008/080347, dated Dec. 10, 2008, 7 pages.
PCT International Search Report and Written Opinion, PCT Application No. PCT/US2009/035193, dated Apr. 22, 2009, 16 pages.
PCT International Search Report and Written Opinion, PCT Application No. PCT/US2009/047250, dated Sep. 25, 2009, 17 pages.
PCT International Search Report and Written Opinion, PCT Application No. PCT/US2011/028231, dated May 19, 2011, 13 pages.
Pearl, J., "Probabilistic Reasoning in Intelligent Systems: Networks of Plausible Inference," 1988, pp. 143-223, Morgan Kaufmann Publishers, Inc.

(56) References Cited

OTHER PUBLICATIONS

Pilka, F. et al., "Multi-step Ahead Prediction Using Neural Networks," 53.sup.rd International Symposium ELMAR-2011, Sep. 14-16, 2011, pp. 269-272, Zadar, Croatia.
Poppel, E., "A Hierarchical Model of Temporal Perception," Trends in Cognitive Sciences, May 1997, pp. 56-61, vol. 1, No. 2.
Poritz, A., "Linear Predictive Hidden Markov Models and the Speech Signal," IEEE, 1982, pp. 1291-1294.
Rachkovskij, "Representation and Processing of Structures with Binary Sparse Distributed Codes," published Apr. 2001.
Rao, R. et al., "Predictive Coding in the Visual Cortex: A Functional Interpretation of Some Extra-classical Receptive-field Effects," Nature Neuroscience, Jan. 1999, pp. 79-87, vol. 2, No. 1.
Rawlinson, D. et al., "Sparse Unsupervised Capsules Generalize Better," arXiv:1804.06094, Apr. 17, 2018, pp. 1-9.
Riesenhuber, M. et al., "Hierarchical Models of Object Recognition in Cortex," Nature Neuroscience, Nov. 1999, pp. 1019-1025, vol. 2, No. 11.
Rinkus, "Hierarchical Sparse Distributed Representations of Sequence Recall and Recognition," published 2006.
Robinson, D. et al., "Spoken Language Identification with Hierarchical Temporal Memories," 2009 CS229 Course on Machine Learning at Stanford University, Dec. 11, 2009, five pages. [Online] [Retrieved Sep. 19, 2013] Retrieved from the Internet <URL: http://cs229.stanford.edu/proj2009/FalcoLeungRobinson.pdf >.
Rojas, R., "Neural Networks, a Systematic Approach," Springer-Verlag, 1996, pp. 20-21, 110-112, and 311-319.
Ross, L., "Discovering and Using Patterns in Plant Floor Data," Numenta HTM Workshop, Jun. 23-24, 2008, SRI Campus, Menlo Park, CA, twelve pages.
Rozell, C.J. et al., "Sparse Coding Via Thresholding and Local Competition in Neural Circuits," Neural Computation, 2008, pp. 2526-2563, vol. 20, No. 10.
Sainath, T. N. et al., "Convolutional Neural Networks for Small-footprint Keyword Spotting," Sixteenth Annual Conference of the International Speech Communication Association, 2015, pp. 1-5.
Saphir, B. "Numenta Web Services," Numenta HTM Workshop, 2009, twenty pages.
Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.
SDSYSTEM24.com, "HTM Optimized Drug Therapy," Numenta HTM Workshop, Jun. 23-24, 2008, SRI Campus, Menlo Park, CA, seven pages.
Simonyan, K. et al., "Very Deep Convolutional Networks for Large-Scale Image Recognition," arXiv:1409.1556, Sep. 4, 2014, pp. 1-10.
Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.
Spence, C. et al., "Varying Complexity in Tree-Structured Image Distribution Models," IEEE Transactions on Image Processing, Feb. 2006, pp. 319-330, vol. 15, No. 2.
Srivastava, N. et al., "Dropout: A Simple Way to Prevent Neural Networks from Overfitting," Journal of Machine Learning Research, vol. 15, Jun. 2014, pp. 1929-1958.
Srivastava, R. K. et al., "Compete to Compute," Advances in Neural Information Processing Systems 26, Dec. 2013, pp. 1-9.
Starzyk, J.A. et al., "Spatio-Temporal Memories for Machine Learning: A Long-Term Memory Organization," IEEE Transactions on Neural Networks, May 2009, pp. 768-780, vol. 20, No. 5.
Stringer, S.M. et al., "Invariant Object Recognition in the Visual System with Novel Views of 3D Objects," Neural Computation, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, Artificial Intelligence Laboratory, Massachusetts Institute of Technology, Cambridge, MA, USA, eleven pages.
Tang, R. et al., "Deep Residual Learning for Small-Footprint Keyword Spotting," arXiv:1710.10361, Oct. 28, 2018, pp. 1-5.
Thomson, A.M. et al., "Interlaminar Connections in the Neocortex," Cerebral Cortex, 2003, pp. 5-14, vol. 13, No. 1.
Thornton, J. et al., "Robust Character Recognition Using a Hierarchical Bayesian Network," Proceedings of the 19.sup.th Australian Joint Conference on Artifical Intelligence, 2006, pp. 1259-1264.
Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.
Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2.
Tugstugi, "pytorch-speech-commands," Jan. 29, 2018, pp. 1-2 [Online] [Retrieved on Apr. 8, 2020] Retrieved from the Internet <URL: https://github.com/tugstugi/pytorch-speech-commands>.
U.S. Office Action, U.S. Appl. No. 11/010,243, dated Jul. 12, 2007, twelve pages.
U.S. Office Action, U.S. Appl. No. 11/147,069, dated Jan. 9, 2007, 27 pages.
U.S. Office Action, U.S. Appl. No. 11/147,069, dated Jan. 9, 2009, thirty-eight pages.
U.S. Office Action, U.S. Appl. No. 11/147,069, dated Jul. 29, 2009, forty-three pages.
U.S. Office Action, U.S. Appl. No. 11/147,069, dated May 15, 2008, thirty-seven pages.
U.S. Office Action, U.S. Appl. No. 11/147,069, dated May 29, 2007, thirty-six pages.
U.S. Office Action, U.S. Appl. No. 11/147,069, dated Oct. 30, 2007, thirty-four pages.
U.S. Office Action, U.S. Appl. No. 11/351,437, dated Aug. 23, 2007, sixteen pages.
U.S. Office Action, U.S. Appl. No. 11/351,437, dated Feb. 20, 2008, six pages.
U.S. Office Action, U.S. Appl. No. 11/622,447, dated May 28, 2008, eighteen pages.
U.S. Office Action, U.S. Appl. No. 11/622,448, dated Apr. 30, 2008, seventeen pages.
U.S. Office Action, U.S. Appl. No. 11/622,448, dated Aug. 24, 2007, nineteen pages.
U.S. Office Action, U.S. Appl. No. 11/622,454, dated Jun. 3, 2008, thirteen pages.
U.S. Office Action, U.S. Appl. No. 11/622,454, dated Mar. 30, 2009, eleven pages.
U.S. Office Action, U.S. Appl. No. 11/622,455, dated Apr. 21, 2010, twelve pages.
U.S. Office Action, U.S. Appl. No. 11/622,456, dated Mar. 20, 2009, nine pages.
U.S. Office Action, U.S. Appl. No. 11/622,456, dated May 7, 2008, fourteen pages.
U.S. Office Action, U.S. Appl. No. 11/622,456, dated Nov. 6, 2008, seven pages.
U.S. Office Action, U.S. Appl. No. 11/622,457, dated Apr. 21, 2009, six pages.
U.S. Office Action, U.S. Appl. No. 11/622,457, dated Aug. 24, 2007, ten pages.
U.S. Office Action, U.S. Appl. No. 11/622,457, dated May 6, 2008, fourteen pages.
U.S. Office Action, U.S. Appl. No. 11/622,457, dated Nov. 20, 2008, eight pages.
U.S. Office Action, U.S. Appl. No. 11/622,458, dated Apr. 1, 2010, sixteen pages.
U.S. Office Action, U.S. Appl. No. 11/680,197, dated Mar. 23, 2010, twelve pages.
U.S. Office Action, U.S. Appl. No. 11/680,197, dated Sep. 14, 2010, seventeen pages.

(56) References Cited

OTHER PUBLICATIONS

U.S. Office Action, U.S. Appl. No. 11/713,157, dated Mar. 31, 2010, fourteen pages.
U.S. Office Action, U.S. Appl. No. 11/945,919, dated Sep. 7, 2010, nineteen pages.
U.S. Office Action, U.S. Appl. No. 12/029,434, dated Mar. 28, 2011, twenty-four pages.
U.S. Office Action, U.S. Appl. No. 12/029,434, dated Nov. 8, 2011, thirty-six pages.
U.S. Office Action, U.S. Appl. No. 12/039,630, dated Nov. 24, 2010, ten pages.
U.S. Office Action, U.S. Appl. No. 12/039,652, dated Mar. 29, 2011, fifteen pages.
U.S. Office Action, U.S. Appl. No. 12/040,849, dated Feb. 3, 2011, thirteen pages.
U.S. Office Action, U.S. Appl. No. 12/040,849, dated Jul. 1, 2011, eighteen pages.
U.S. Office Action, U.S. Appl. No. 12/147,348, dated Oct. 11, 2011, forty-three pages.
U.S. Office Action, U.S. Appl. No. 12/288,185, dated Sep. 15, 2010, eleven pages.
U.S. Office Action, U.S. Appl. No. 12/483,642, dated Apr. 26, 2012, twelve pages.
U.S. Office Action, U.S. Appl. No. 12/483,642, dated Aug. 10, 2012, seven pages.
U.S. Office Action, U.S. Appl. No. 12/751,808, dated Oct. 28, 2010, thirteen pages.
U.S. Office Action, U.S. Appl. No. 13/151,928, dated Aug. 2, 2011, eight pages.
U.S. Office Action, U.S. Appl. No. 13/218,170, dated Jul. 5, 2013, six pages.
U.S. Office Action, U.S. Appl. No. 13/218,194, dated Oct. 5, 2012, fourteen pages.
U.S. Office Action, U.S. Appl. No. 13/227,355, dated May 25, 2012, twenty-four pages.
U.S. Office Action, U.S. Appl. No. 13/333,865, dated May 16, 2012, twenty-four pages.
United States Office Action, U.S. Appl. No. 13/218,202, dated Feb. 3, 2014, eleven pages.
United States Office Action, U.S. Appl. No. 13/658,200, dated May 8, 2015, seventeen pages.
United States Office Action, U.S. Appl. No. 13/046,464, dated Apr. 6, 2015, 15 pages.
United States Office Action, U.S. Appl. No. 13/046,464, dated Apr. 9, 2014, 16 pages.
United States Office Action, U.S. Appl. No. 13/046,464, dated Jun. 19, 2013, 14 pages.
United States Office Action, U.S. Appl. No. 13/046,464, dated Nov. 28, 2014, 16 pages.
United States Office Action, U.S. Appl. No. 13/046,464, dated Oct. 16, 2013, 16 pages.
Van Essen, D.C. et al., "Information Processing Strategies and Pathways in the Primate Visual System," An Introduction to Neural and Electronic Networks, 1995, pp. 45-76.
Vaught, T.N., "Software Design in Scientific Computing," Jun. 23, 2008, Numenta HTM Workshop, Jun. 23-24, 2008, SRI Campus, Menlo Park, CA, thirty-two pages.
Vlajic, "Vector Quantization of Images Using Modified Adaptive Resonance Algorithm for Hierarchical Clustering," IEEE Transactions on Neural Networks, 2001, pp. 1147-1162, vol. 12, No. 5.
Weiss, R. et al., "HyPursuit: A Hierarchical Network Search Engine that Exploits Content-Link Hypertext Clustering," Proceedings of the Seventh Annual ACM Conference on Hypertext, Mar. 16-20, 1996, pp. 180-193, Washington, D.C., USA.
Wiskott, L. et al., "Slow Feature Analysis: Unsupervised Learning of Invariances," Neural Computation, 2002, pp. 715-770, vol. 14, No. 4.
Wu, G. et al., "Multi-camera Spatio-temporal Fusion and Biased Sequence-data Learning for Security Surveillance," Association for Computing Machinery, 2003, pp. 528-538.
Yedidia, J.S. et al., "Understanding Belief Propagation and its Generalizations," Joint Conference on Artificial Intelligence (IJCAI 2001), Aug. 4-10, 2001, Seattle, WA, USA, thirty-five pages.
Zayyani, H. et al., "Bayesian Pursuit Algorithm for Sparse Representation," 2009 IEEE International Conference on Acoustics, Speech and Signal Processing, ICASSP 2009, IEEE, 2009, pp. 1549-1552.
Zemel, R.S., "Cortical Belief Networks," Computational Models for Neuroscience, 2003, pp. 267-287, Hecht-Nielsen, R. et al., eds., Springer-Verlag, New York.
Zhang, R. et al., "Bayesian methodology for reliability model acceptance," Reliability Engineering & System Safety, 2003, pp. 95-103, vol. 80.

\* cited by examiner

Table 1

| Network | L1 Nodes | L1 Sparsity | L1 Weight Sparsity | L2 Nodes | L2 Output Sparsity | L2 Weight Sparsity | L3 Nodes | L3 Output Sparsity | L3 Weight Sparsity |
|---|---|---|---|---|---|---|---|---|---|
| sparseCNN2 | 64 | 90.50% | 0% | 64 | 87.50% | 0% | 1000 | 90.00% | 60.00% |
| sparseCNN2WtSparsity | 64 | 90.50% | 0% | 64 | 87.50% | 80.00% | 1000 | 90.00% | 60.00% |
| sparseCNN2WtSparsity2 | 64 | 90.50% | 50% | 64 | 87.50% | 80.00% | 1000 | 90.00% | 60.00% |
| sparseCNN2WtSparsity3 | 64 | 90.50% | 50% | 64 | 87.50% | 90.00% | 1000 | 90.00% | 60.00% |
| sparseCNN2WtSparsity4 | 64 | 90.50% | 50% | 64 | 87.50% | 95.00% | 1000 | 90.00% | 60.00% |
| sparseCNN2WtSparsity8 | 64 | 90.50% | 50% | 64 | 87.50% | 60.00% | 1000 | 90.00% | 95.00% |
| sparseCNN2WtSparsity9 | 64 | 90.50% | 50% | 64 | 87.50% | 80.00% | 1000 | 90.00% | 95.00% |
| sparseCNN2WtSparsity10 | 64 | 90.50% | 50% | 64 | 87.50% | 80.00% | 1500 | 90.00% | 95.00% |
| sparseCNN2WtSparsity11 | 64 | 90.50% | 50% | 64 | 87.50% | 80.00% | 1500 | 90.00% | 95.00% |
| sparseCNN2WtSparsity18 | 64 | 90.50% | 50% | 64 | 87.50% | 80.00% | 1000 | 90.00% | 90.00% |
| sparseCNN2WtSparsity19 | 64 | 90.00% | 50% | 64 | 90.00% | 80.00% | 2000 | 90.00% | 95.00% |
| sparseCNN2WtSparsity20 | 64 | 90.00% | 50% | 64 | 90.00% | 80.00% | 2000 | 95.00% | 97.00% |
| SuperSparseCNN2 | 64 | 90.50% | 0% | 64 | 87.50% | 0.00% | 1500 | 93.30% | 90.00% |
| SuperSparseCNNLocal | 64 | 90.50% | 0% | 64 | 87.50% | 0.00% | 1500 | 93.30% | 90.00% |
| denseCNN2 | 64 | ReLU (~50%) | 0% | 64 | ReLU (~50%) | 0.00% | 1000 | ReLU (~50%) | 0.00% |

FIG. 10

Table 2

| Network | Test Score | Noise Score | Noise Accuracy | Non-zero Parameters | Number of Trials |
|---|---|---|---|---|---|
| sparseCNN2 | 9711.21 ± 10.67 | 12,463 ± 1091.03 | 44.40 ± 3.89 | 757,140 | 10 |
| sparseCNN2WtSparsity2 | 9708.86 ± 17.62 | 12,232 ± 1077.11 | 43.57 ± 3.84 | 674,452 | 10 |
| sparseCNN2WtSparsity3 | 9699.84 ± 16.92 | 12,595 ± 759.51 | 44.87 ± 2.71 | 664,212 | 10 |
| sparseCNN2WtSparsity4 | 9671.24 ± 15.82 | 11,374 ± 1029.16 | 40.52 ± 3.67 | 659,092 | 10 |
| sparseCNN2WtSparsity8 | 9703.37 ± 14.87 | 11,048 ± 1026.98 | 39.36 ± 3.66 | 134,932 | 10 |
| sparseCNN2WtSparsity9 | 9669.28 ± 49.73 | 11,818 ± 1258.77 | 42.10 ± 4.48 | 114,452 | 10 |
| sparseCNN2WtSparsity10 | 9692.40 ± 8.45 | 11,909 ± 711.71 | 42.42 ± 2.54 | 160,952 | 10 |
| sparseCNN2WtSparsity11 | 9703.37 ± 14.13 | 12,478 ± 712.47 | 44.45 ± 2.54 | 160,952 | 10 |
| sparseCNN2WtSparsity18 | 9704.15 ± 9.48 | 12,471 ± 744.08 | 44.43 ± 2.65 | 194,452 | 10 |
| sparseCNN2WtSparsity19 | 9715.91 ± 11.52 | 11,773 ± 1134.45 | 41.94 ± 4.04 | 207,452 | 10 |
| sparseCNN2WtSparsity20 | 9692.79 ± 10.83 | 12,256 ± 1179.41 | 43.66 ± 4.20 | 143,452 | 10 |
| sparseCNN2WtSparsity21 | 97.02 ± 0.10 | 11,930 ± 829.67 | 42.50 ± 2.96 | 114,452 | 10 |
| denseCNN2 | 9668.63 ± 45.54 | 8,165 ± 751.59 | 29.08 ± 2.68 | 1,717,140 | 30 |

FIG. 11

PERFORMING INFERENCE AND TRAINING USING SPARSE NEURAL NETWORK

BACKGROUND

1. Field of the Disclosure

The present disclosure relates to a neural network for processing input data, and more specifically to a sparse neural network for performing inference and training on input data.

2. Description of the Related Arts

Machine-learned neural networks can be used to perform a wide variety of tasks, including inference and prediction, on input data. For example, a neural network can be used to perform object detection on whether content items such as images or videos contain objects-of-interest. As another example, a neural network can be used to predict likelihoods that users will interact with a content item, or predict the next one or more word tokens given previous word tokens in an electronic document.

A neural network may generally include a set of layers, each including one or more nodes. A layer output at nodes of a given layer is generated by applying a transformation to the layer output at nodes of a previous layer. Specifically, during the inference process, the layer output of the given layer is generated by applying a set of weights associated with the layer to the layer output of the previous layer. The set of weights represents connections between nodes of the given layer and nodes at the previous layer, and are updated through a training process. The inference data can be generated by propagating the input data through the layers of the neural network.

SUMMARY

Embodiments relate to performing inference using a neural network where sparsity of weights for producing a layer output in a current layer is equal to or above a threshold. The neural network may include at least the current layer that generates an intermediate output for nodes of the current layer by applying the set of weights to a layer output of a previous layer that is based on input data. The layer outputs for nodes of the current layer are generated by processing the intermediate outputs. Specifically, the layer outputs may be generated by selecting intermediate outputs for a subset of nodes of the current layer, and may have a sparsity equal to or greater than a second threshold.

BRIEF DESCRIPTION OF THE DRAWINGS

The teachings of the embodiments of the present invention can be readily understood by considering the following detailed description in conjunction with the accompanying drawings.

FIG. 10 illustrates sparsity characteristics for weights and layer outputs of a set of example neural networks.

FIG. 11 illustrates experimental performance metrics of the example neural networks.

DETAILED DESCRIPTION OF EMBODIMENTS

Figure 1:
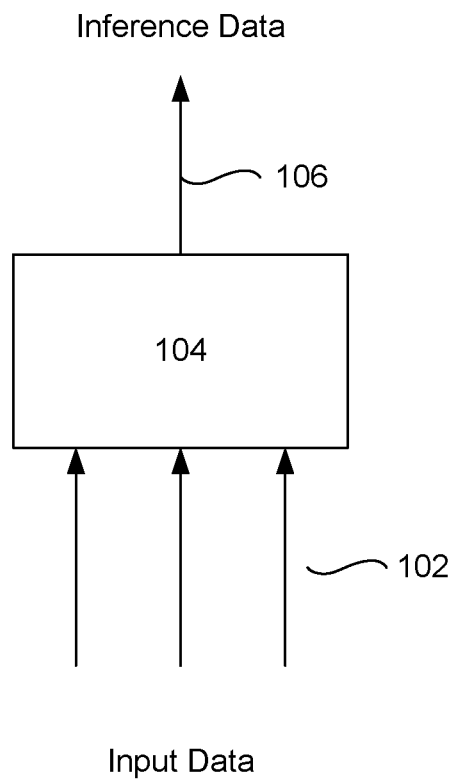
FIG. 1 is a conceptual diagram of an inference system 104, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, embodiments are not described with reference to any particular programming language. It will be appreciated that a variety of programming languages may be used to implement the teachings as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to an inference system for training and performing inference using a sparse neural network. The sparse neural network may include one or more layers, and each layer may be associated with a set of sparse weights that represent sparse connections between nodes of a layer and nodes of a previous layer. A layer output may be generated by applying the set of sparse weights associated with the layer to the layer output of a previous layer. Moreover, the one or more layers of the sparse neural network may generate sparse layer outputs. By using sparse representations of weights and layer outputs, robustness and stability of the neural network can be significantly improved, while maintaining competitive accuracy. In addition, sparse neural networks can be more efficient to process computationally, since many operations, such as multiplication, can be skipped due to the high number of zero values in the neural network.

High-Level Overview of Inference System

FIG. 1 is a conceptual diagram of an inference system 104, according to one embodiment. The inference system 104 performs inference and predictions on input data 102. In one particular embodiment referred throughout the remainder of the specification, the inference system 104 performs inference on input data 102, and generates inference data 106. For example, the inference system 104 may receive input data 102 corresponding to images of a road, and perform object recognition for pedestrians based on the received inputs. The inference data 106 may indicate locations of pedestrians in the image. As another example, the inference system 104 may receive input data 102 corresponding to input text in an electronic document, and the inference data 106 may indicate predictions for the next word tokens that are likely to come after the input text.

The input data 102 may include, among others, images, videos, audio signals, sensor signals (e.g., tactile sensor signals), data related to network traffic, financial transaction data, communication signals (e.g., emails, text messages, and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation) and medical treatment data. The underlaying representation (e.g., photo, audio, etc.) can be stored in a non-transitory storage medium. In one embodiment, the input data 102 is encoded into a vector signal and fed to the inference system 104.

The inference system 104 may process the input data 102 to produce the inference data 106 representing, among others, identification of objects, identification of recognized gestures, classification of digital images as pornographic or non-pornographic, identification of email messages as unsolicited bulk email ("spam") or legitimate email ("non-spam"), identification of a speaker in an audio recording, classification of loan applicants as good or bad credit risks, identification of network traffic as malicious or benign, identify of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, identification of anomalous patterns in insurance records, prediction on results of experiments, indication of an illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, and a summary of text or prediction on reaction to medical treatments.

The inference system 104 performs inference using a neural network that includes a set of layers of nodes, in which a layer output at nodes of a current layer are a transformation of the layer outputs at previous layers. Specifically, the layer output at nodes of the current layer may be generated by applying a set of weights to the layer output of the previous layers. The set of weights represent connections between nodes of the current layer and nodes at the previous layers, and are learned through a training process.

The inference data 106 is generated by propagating the input data 102 through the layers of the neural network.

In one embodiment, the inference system 104 performs inference using a sparse neural network. The sparse neural network includes one or more layers associated with a set of sparse weights, in which a sparsity of the set of weights is equal to or above a first threshold. Moreover, the sparse neural network may include one or more layers that generate sparse layer outputs where a sparsity of the layer output is equal to or above a second threshold. As defined herein, sparsity refers to the ratio of the number of zero elements to the total number of elements in a set.

In one embodiment, the inference system 104 trains the sparse neural network using a set of training input data and corresponding training inference data to reduce a loss function. For this purpose, the inference system 104 performs training by selecting a subset of weights of the sparse neural network and determines a set of sparse weights for one or more layers. The inference system 104 generates estimated inference data by propagating the training input data through the sparse neural network. The one or more layers generate sparse layer outputs during the training process. The inference system 104 determines a loss function that indicates a difference between training inference data and the estimated inference data, and the set of sparse weights are updated to reduce the loss function.

By taking advantage of sparse representations of weights and layer outputs, the inference system 104 can perform inference and training of the neural network with significantly faster computational speed and less computational resources compared to relatively dense neural networks. Moreover, sparse representation also leads to a significant improvement in robustness and stability with respect to noisy inputs, while maintaining competitive prediction accuracy similar to or above the prediction accuracy of relatively dense neural networks.

Inference Process of a General Neural Network

Figure 2:
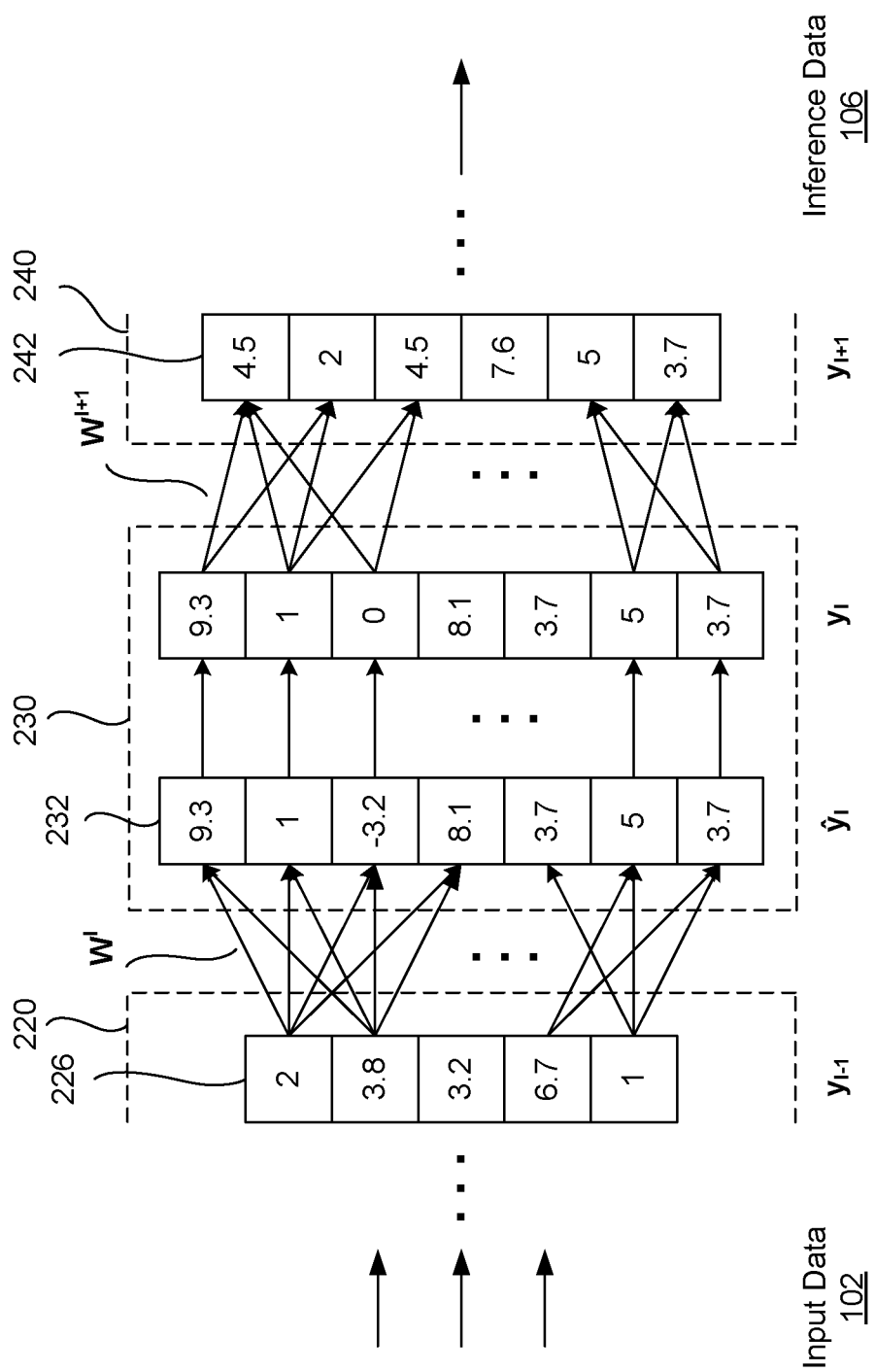
FIG. 2 illustrates an example process for performing inference using a neural network, according to an embodiment.

FIG. 2 illustrates an example process for performing inference using a neural network, according to an embodiment. The neural network includes a set of layers l=1, 2, . . . , n, each including one or more nodes. For example, in FIG. 2, the neural network includes, among other layers, l−1-th layer 220 including five nodes 226, l-th layer 230 including seven nodes 232, and l−1-th layer 240 including six nodes 242. The neural network illustrated in FIG. 2 may represent a network with a relatively dense set of weights and layer outputs. In addition, while the layers 220, 230 in FIG. 2 are illustrated as intermediate layers that are placed between an input layer that receives the input data and an output layer that generates the inference data, it is appreciated that in other embodiments, any one of the layers 220, 230 may be the input layer or the output layer.

The neural network includes a set of weights $W^l$, l=1, 2, . . . , n associated with each layer. Each non-zero weight may indicate a connection between a node in a current layer and a node in the previous layer. For example, in FIG. 2, the neural network also includes a set of weights $W^l$ associated with the l-th layer 230 that represent connections between nodes of the l-th layer 230 and nodes of the previous l−1-th layer 220. The neural network also includes a set of weights $W^{l+1}$ associated with the l+1-th layer 240 that represent connections between nodes of the l+1-th layer 240 and nodes of the previous l-th layer 230. Each node in the layer 230 may be fully connected to nodes of the previous layer, resulting in a large number of connections and a relatively dense set of weights.

During the inference process, the input data 102 is propagated through the neural network starting from the first layer, to generate layer outputs $y^l$, l=1, 2, . . . , n, and eventually, the inference data 106. Specifically, a current layer receives the layer output of nodes at a previous layer, and generate an intermediate output by applying the set of weights for the current layer to the layer output of the previous layer. In particular, a set weights may only be applied to generate an output at connected nodes. The current layer may further generate the layer output by processing the intermediate outputs through an activation function $g_l(\cdot)$ for the layer. In one instance, the activation function may be a rectified linear unit (ReLU) function applied to the intermediate output of each node.

For example, in the neural network shown in FIG. 2, the l-th layer 230 receives the layer output $y_{l-1}$ of the five nodes at the previous l−1-th layer 220, and generate an intermediate output $\hat{y}_l$ by applying the set of weights $W^l$ to the layer output $y_{l-1}$ of the previous layer. The l-th layer 230 further generates the layer output $y_l$ by applying the ReLU activation function to the intermediate output $\hat{y}_l$ of each node. In the example shown in FIG. 2, the sparsity of the l-th layer output $y_l$ can be determined as 1−6/7, which is less than 0.14, or 14%. Since the weights and layer outputs are relatively dense, the architecture shown in FIG. 2 may require a significant amount of memory and computational power to generate inference data 106.

Inference Process of Sparse Neural Network

Figure 3:
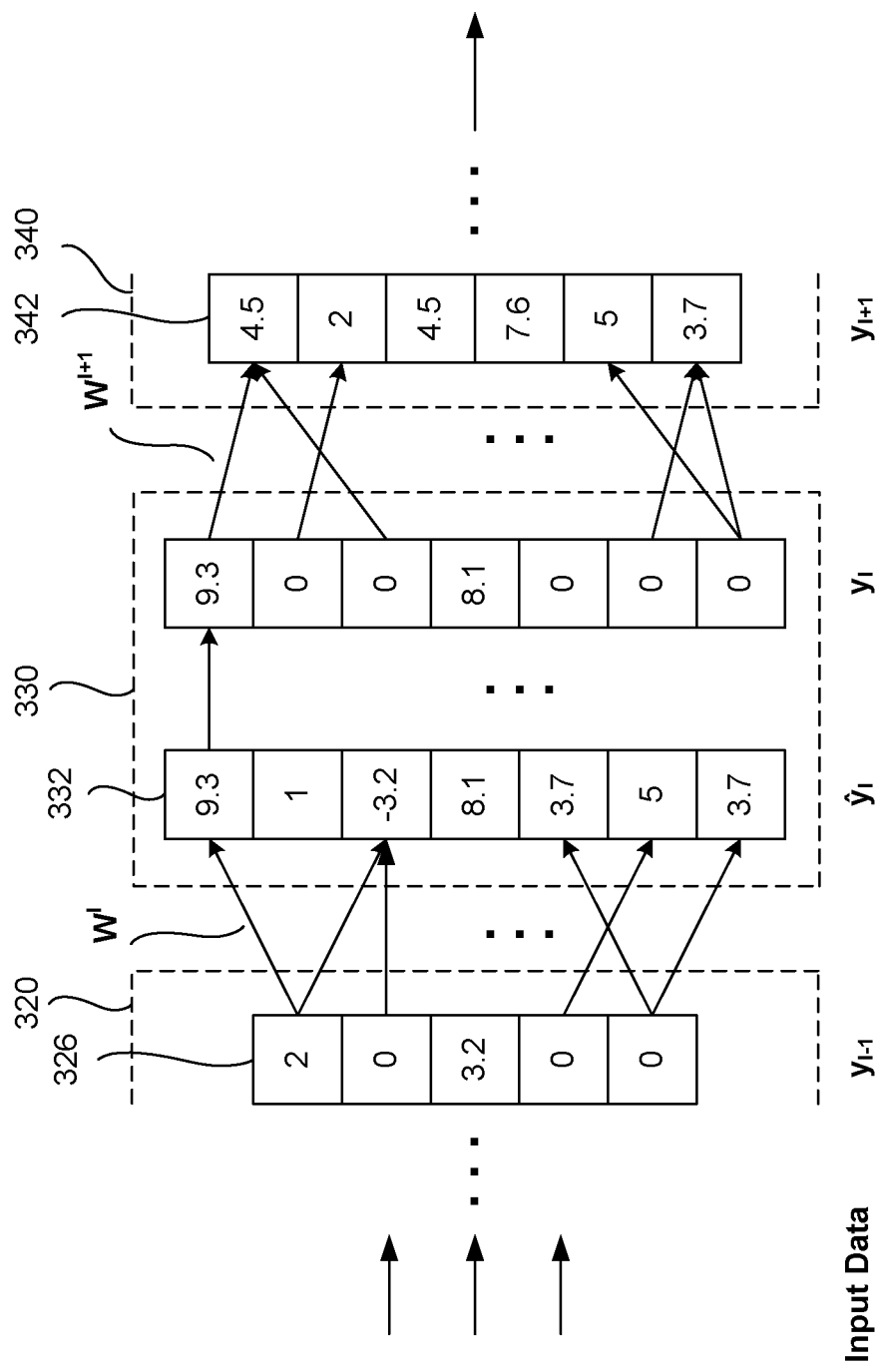
FIG. 3 illustrates an example process for performing inference using a sparse neural network, according to an embodiment.

FIG. 3 illustrates an example process for performing inference using a sparse neural network, according to an embodiment. The sparse neural network shown in FIG. 3 includes, among other layers, l−1-th layer 320 including five nodes 326, l-th layer 330 including seven nodes 332, and l−1-th layer 340 including six nodes 342. In contrast to the neural network shown in FIG. 2, the sparse neural network includes one or more layers associated with a set of sparse weights and/or sparse layer outputs.

The sparse neural network may include a set of sparse weights for one or more layers of the architecture. In one instance, the set of sparse weights may have a sparsity equal to or greater than a first threshold. Specifically, as shown in the example architecture in FIG. 3, the number of connections between nodes of the l-th layer 330 and nodes of the previous l−1-th layer 320, and the number of connections between nodes of the l+1-th layer 340 and nodes of the previous l-th layer 330 may be significantly smaller than the neural network shown in FIG. 2. As a result, of the set of weights $W^l$ associated with the l-th layer 330, and the set of weights $W^{l+1}$ associated with the l+1-th layer 340 may have relatively high sparsity.

In one embodiment, the sparsity for a set of weights with respect to the total number of possible connections between the current layer and the previous layer may be equal to or greater than a first threshold. Thus, the sparsity may be determined as the ratio of the number of zero weight values to the total number of possible connections between the current layer and the previous layer, and this ratio may be equal to or greater than a first threshold. For example, in the architecture shown in FIG. 3, the sparsity for the set of weights $W^l$ may be determined as the ratio of the number of zero connections to the total number of connections between layer 330 and layer 320. The total number of possible connections is 7 nodes×5 nodes=35 possible connections. In one instance, a set of sparse weights may have a sparsity equal to or greater than 0.30. In other instances, the sparsity may be equal to or greater than 0.70, or may be equal to or greater than 0.90.

In other embodiments, the inference system 104 identifies one or more subsets of possible connections that each represent possible connections between a subset of nodes in the current layer and a subset of nodes in the previous layer. The sparsity for a set of weights with respect to each subset of possible connections may be equal to or greater than a first threshold. Specifically, the sparsity for a subset of possible connections may be determined as the ratio of the number of zero weight values to the number of possible connections in the subset, and the ratio within each of these subsets of connections may be equal to or above the first threshold. For example, in the architecture shown in FIG. 3, the inference system 104 may identify subsets of possible connection between each individual node in the current layer and nodes of the previous layer. For an individual node in the layer 330, the sparsity may be determined as the ratio of the number of zero weight values to the number of possible connections between the individual node in the layer 330 and nodes of the previous layer 320, which is 5 possible connections. In such an example, the sparsity for the set of weights with respect to the subset of possible connections for each node in the layer 330 may be equal to or greater than a first threshold. In one instance, a set of sparse weights for each subset of possible connections may have a sparsity equal to or greater than 0.30. In other instances, the sparsity may be equal to or greater than 0.70, or may be equal to or greater than 0.90.

In one instance, the sparsity of the set of weights for one or more layers of the sparse neural network may be determined such that each individual node in the layer is associated with a fixed number of non-zero weights. For example, in the architecture shown in FIG. 3, every node in the l-th layer 330 may be associated with a fixed number of two connections. Fixing the number of non-zero connections for each node result in a fixed number of matrix multiplications, and may significantly improve the computational speed and efficiency when the sparse neural network is implemented on hardware, such as field-programmable gate arrays (FPGA).

The sparse neural network may also include one or more layers that generate sparse layer outputs. In one embodiment, the sparsity for a layer output may be equal to or greater than a second threshold. The sparse layer output may be generated by selecting a subset of nodes based on the values of their intermediate outputs, and zeroing the remaining subset of nodes in the current layer. In one instance, the selected subset of nodes are nodes having intermediate outputs above a threshold value or a threshold proportion within all nodes of the current layer. Thus, the sparsity for the layer output may be determined as the ratio of the number of nodes with zero values to the total number of nodes in the current layer, and this ratio may be equal to or greater than a second threshold. For example, in the architecture shown in FIG. 3, after generating the set of intermediate outputs, the l-th layer 330 further generates sparse layer outputs $y_l$ by selecting a subset of nodes having intermediate outputs $\hat{y}_l$ above a threshold value of 8.0, and zeroing the remaining nodes in the layer 330. In particular, since the first node and the fourth node are associated with intermediate outputs above 8.0, the values for the subset of nodes are selected, and the intermediate outputs for the remaining subset of nodes are zeroed to generate the sparse layer output $y_l$. The sparsity of the layer output for the l-th layer 330 may be determined as the ratio of the number of zero values in layer 330 to the number of nodes in layer 330, which is 5 nodes/7 nodes ~0.71. In one instance, a sparse layer output may have a sparsity equal to or greater than 0.80. In other instances, the sparsity may be equal to or greater than 0.90.

In other instances, the inference system 104 identifies subgroups of nodes in the current layer. The sparsity of the layer output within each subgroup of nodes may be equal to or greater than a second threshold by selecting a subset of nodes within each subgroup of nodes. For example, a subset of nodes may be selected within each subgroup that have intermediate outputs above a threshold value or threshold proportion within that subgroup. The sparsity may be determined as the ratio of the number of zero values to the number of nodes in a subgroup, and the sparsity for each of these subgroups may be equal to or greater than a second threshold. For example, in the architecture shown in FIG. 3, the sparsity of the layer output of the l-th layer 330 may be determined with respect to two subgroups nodes in the layer 330, the first subgroup including first to fourth nodes, and the second subgroup including fifth to seventh nodes. As an example, one node with the highest intermediate output may be selected within each subgroup for high sparsity. Thus, the first node within the first subgroup, and the seventh node within the second subgroup are selected, and the values for the remaining subset of nodes may be zeroed to generate the sparse layer output $y_l$. The sparsity for a subgroup may be determined as the ratio of the number of zero values to the number of nodes in the subgroup, and the sparsity for each of these subgroups may be equal to or above a second threshold.

In one instance, one or more layers of the sparse neural network may generate sparse layer outputs such that the sparsity of each layer output is associated with a fixed number of non-zero values. For example, a fixed subset of nodes in each layer may be selected based on their intermediate values (e.g., fixed subset of nodes with highest intermediate values), and the remaining subset may be assigned zeros. For example, in in FIG. 3, the l-th layer 330, as well as other layers, may generate a sparse layer output with a fixed number of three non-zero values to improve computational speed and efficiency when the neural network is implemented on hardware. As another example, a fixed subset of nodes may be selected from each subgroup of nodes based on their intermediate values (e.g., fixed subset of nodes within the subgroup with highest intermediate values), such that each subgroup has the same number of non-zero nodes, and the remaining subset in each subgroup may be assigned zeros.

All or a subset of layer of the sparse neural network may generate sparse layer outputs, or have connections associated with a sparse set of weights. For example, the sparse neural network may include a subset of layers that generate sparse layer outputs, and a remaining subset of layers that generate relatively dense layer outputs with a sparsity less than a predetermined threshold or predetermined proportion of nodes, or have connections with a relatively dense set of weights. Moreover, while a given layer may have both sparse layer outputs and sparse weights, a layer may only generate sparse layer outputs, or only have connections with a sparse set of weights.

In FIG. 3, sparse layers and sparse weights have been described with respect to a feed forward architecture, in which nodes of a current layer are connected to nodes of a previous layer that is spatially placed immediately before the current layer. However, in other embodiments, the sparse neural network described in conjunction with FIG. 3 can be applied to any type of neural network including one or more layers of nodes, and include connections between nodes of layers represented by a set of weights.

For example, in recurrent neural networks, including long short-term memory (LSTM) architectures, a current layer of nodes may be connected to a previous layer that represents the same layer of nodes but temporally placed at a previous time. The set of weights representing these connections may have a sparsity equal to or above a first threshold. As another example, a current layer of nodes may also be connected to multiple previous layers, instead of one previous layer. For example, in residual neural networks, a current layer of nodes may be connected to two or more previous layers, such as a first previous layer placed immediately before the layer, and a second previous layer placed before the first previous layer. The collection of weights representing both sets of connections may have a sparsity equal to or above a first threshold, and/or sparse layer outputs may be generated at the current layer of nodes at one or more time steps that have a sparsity equal to or above a second threshold.

Figure 4:
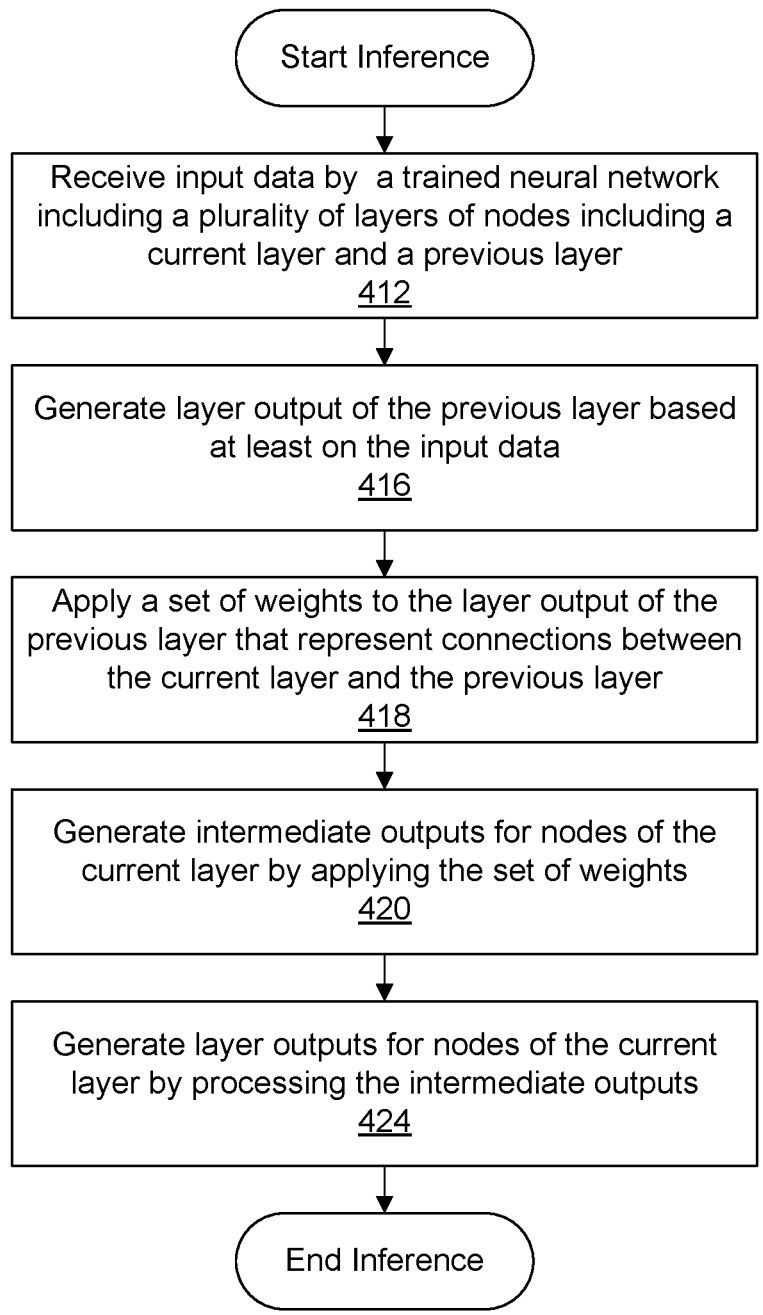
FIG. 4 is a flowchart illustrating a method of performing inference using a sparse neural network, according to one embodiment.

FIG. 4 is a flowchart illustrating a method of performing inference using a sparse neural network, according to one embodiment. The inference system 104 receives 412 input data by a trained neural network including a plurality of layers of nodes including a current layer and a previous layer. The inference system 104 generates 416 a layer output of the previous layer based at least on the input data. A set of weights is applied 418 to the layer output of the previous layer that represent connections between nodes of the current layer and nodes of the previous layer. Intermediate outputs for nodes of the current layer are generated 420 by applying the set of weights for the current layer to the layer output of the previous layer. The sparsity of the set of weights may be equal to or above a first threshold. Layer outputs for nodes of the current layer are generated 424 by processing the intermediate outputs. The layer outputs may be generated by selecting intermediate outputs for a subset of nodes in the layer.

The steps shown in FIG. 4 are merely illustrative. One or more of these steps may be used in conjunction, selected or discarded, and/or varied during operation of the inference process. For example, one or more of these steps may be performed in a parallel operation and not in a particular sequence.

Training Process of a Sparse Neural Network

Figure 5:
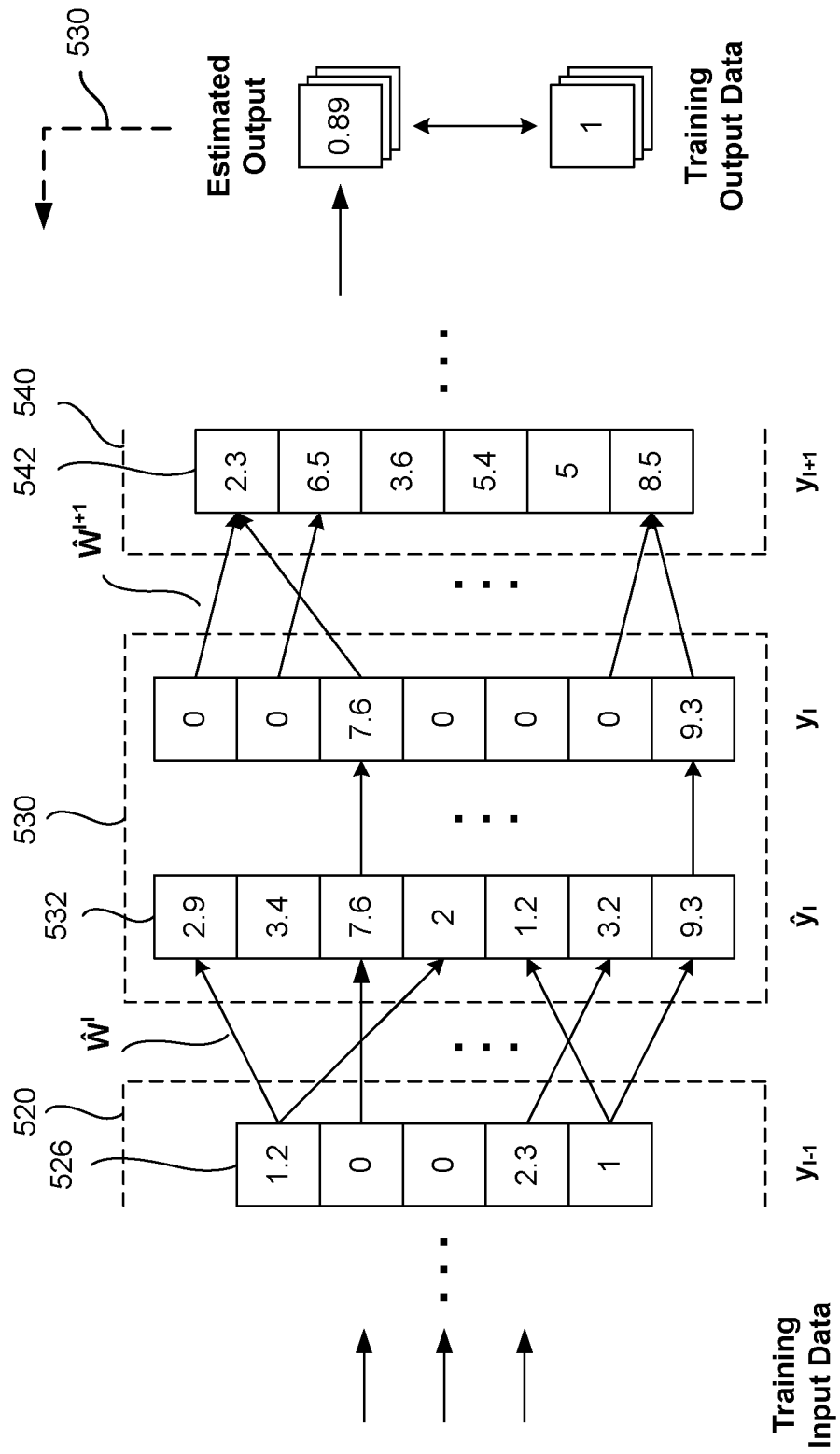
FIG. 5 illustrates an example process for training a sparse neural network, according to an embodiment.

FIG. 5 illustrates an example process for training a sparse neural network, according to an embodiment. The sparse neural network shown in FIG. 5 includes, among other layers, l−1-th layer 520 including five nodes 526, l-th layer 530 including seven nodes 532, and l−1-th layer 540 including six nodes 542.

The inference system 104 trains the weights of the sparse neural network using a set of training data. The training data includes multiple instances of training input data and training inference data. The training inference data contains known instances of inference data that represent the type of data that the neural network is targeted to predict from the corresponding target input data. For example, the neural network may predict whether an image contains a pedestrian. The training input data may contain multiple images from different scenes, and the corresponding training inference data may contain known labels indicating whether a pedestrian was included in these images.

The inference system 104 trains the sparse neural network by reducing a loss function that indicates a difference between training inference data and estimated inference data that is generated by propagating the corresponding training input data through the architecture. The weights of the sparse neural network may be trained during the training process to learn correlations or relationships between the training input data and the training inference data, such that accurate inference data can be generated for new instances of input data during the inference process.

In one embodiment, the inference system 104 starts the training process by selecting, for each of one or more layers of a neural network, a set of weights that will participate in the training process, such that the sparsity for the selected set of weights is above a first threshold. After the training process, the set of selected weights may be used to generate inference data during the inference process. In one instance, the selected set of weights for a current layer may be randomly sampled from potential connections or subsets of connections between the current layer and a previous layer. In another instance, the selected set of weights for the current layer may be determined based on a rule or criteria by the inference system 104. The remaining set of weights that were not selected are assigned zero values.

In one embodiment, the inference system 104 reduces the loss function by repeatedly iterating a forward pass step and a backpropagation step. During the forward pass step, the inference system 104 generates estimated inference data by propagating a batch of training input data through the sparse neural network. During the backpropagation step, the inference system 104 determines the loss function that indicates a difference between the training inference data and the estimated inference data. The inference system 104 updates the weights of the sparse neural network by backpropagating error terms obtained from the loss function. This process is repeated for multiple iterations with next batches of training data until predetermined criteria is reached. In one instance, to maintain zero values for weights that were not selected in the training process, the inference system 104 zeros the error terms for these weights before each backpropagation step. Alternatively, when these weights have been updated to non-zero values after a backpropagation step, the inference system 104 re-assigns zero values to these weights after the backpropagation step such that zero values are maintained in the sparse neural network.

In FIG. 5, the training process of the sparse neural network has been described with respect to using backpropagation to update the set of weights for reducing the loss function. However, it is appreciated that in other embodiments, any type of optimization algorithm can be used, such as local search methods or other types of global search methods, to reduce the loss function of the architecture.

As discussed in conjunction with FIG. 3, each layer in one or more layers of the sparse neural network may generate sparse layer outputs. Thus, during the forward pass step for an iteration in the training process, a current layer may generate sparse layer outputs based on values of nodes generated by propagating the training data for the iteration through the sparse neural network. For example, a current layer may generate intermediate layer outputs by applying the set of weights for the iteration to layer outputs of the previous layer. The current layer may further generate sparse layer outputs by selecting a subset of nodes having intermediate outputs above a threshold for that iteration. This process may be repeated for subsequent iterations, and different subsets of nodes may be selected at different iterations depending on the training data and the updated values of the weights.

In one embodiment, during the training process, a current layer in the sparse neural network further generates sparse layer outputs for an iteration based on how frequently nodes have been selected during previous training iterations. Specifically, during the training process, a relatively small number of nodes for a given layer may initially dominate, and be repeatedly selected as sparse layer outputs throughout the training process. Having a small number of selected nodes may affect the representation of information in the sparse neural network structure, and thus, may affect the robustness of the neural network.

Thus, in one instance, one or more layers in the sparse neural network generate sparse layer outputs by determining a boosting term for nodes that favor selection of nodes that have not been selected in recent iterations. Specifically, at a training iteration, a current layer may generate sparse layer outputs by selecting a subset of nodes based on their boosting terms that take into account intermediate output of the nodes, as well as how frequently the nodes have been selected as sparse layer outputs in previous training iterations. The inference system 104 may determine boosting terms for layers that generate sparse outputs, perform the forward pass step and the backpropagation step. This process may be repeated for multiple iterations until predetermined criteria is reached.

To determine the boosting term for an iteration, the inference system 104 determines a running average of the duty cycle for a node at the iteration. The duty cycle of the node indicates how frequently the node had been selected as a sparse layer output in one or more previous iterations. In one instance, the running average of the duty cycle $d_i^l(t)$ for a node i in layer l at iteration t is given by:

$$d_i^l(t)=(1-\alpha)\cdot d_i^l(t-1)+\alpha\cdot[i\in\text{topIndices}] \quad (1)$$

where $d_i^l(t-1)$ is the duty cycle of the node at a previous iteration t−1, [i∈topIndices] indicates whether the intermediate output for the node is above the threshold value or the threshold proportion within nodes or subgroups of nodes in layer l, and α is a parameter that balances the relative contribution of the intermediate output for the node and the previous duty cycle for the node to the boosting term.

Based on the running average of the duty cycle, the inference system 104 determines the boosting term for the node that increases as the duty cycle for the node decreases, and decreases as the duty cycle for the node increases. In one instance, the boosting term $b_i^l(t)$ for node i in layer l at iteration t is given by:

$$b_i^l(t) = e^{\beta(a^l-d_i^l(t))} \quad (2)$$

where $a^l$ is the target duty cycle reflecting the percentage of nodes in the layer that are expected to be selected, and β is a parameter controlling the strength of the boosting. While the relationship between the boosting term and the duty cycle is described as an exponential function in equation (2), embodiments are not limited hereto, and other types of functions can be used.

Figure 6:
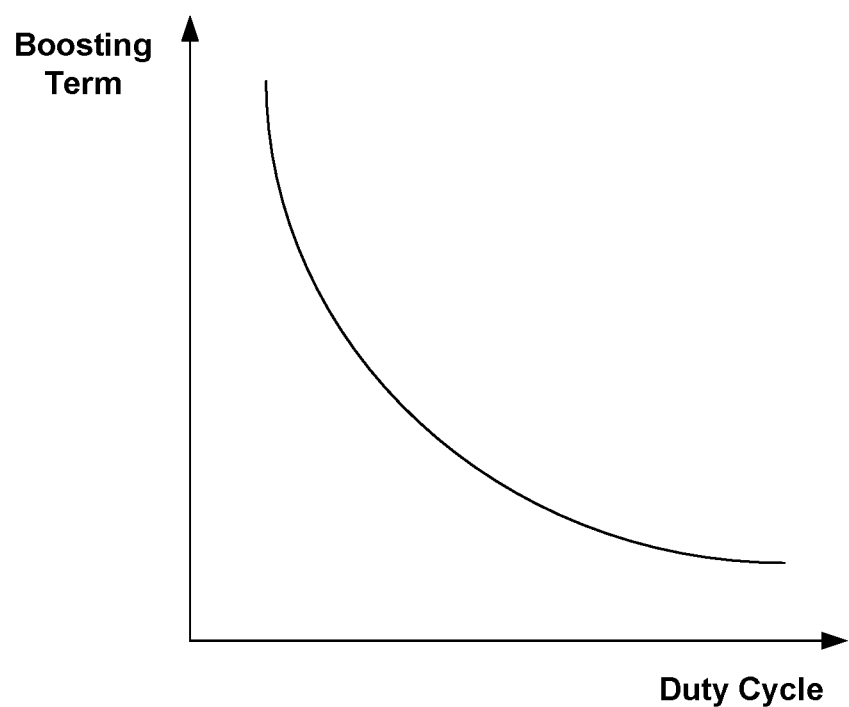
FIG. 6 illustrates an example exponential relationship between the boosting term and the duty cycle for a node, according to an embodiment.

FIG. 6 illustrates an example exponential relationship between the boosting term and the duty cycle for a node, according to an embodiment. As shown in FIG. 6, the boosting term increases as the duty cycle for the node decreases, and decreases as the duty cycle for the node increases. Since the duty cycle indicates how frequently the node has been selected as sparse layer outputs for previous iterations, selecting the subset of nodes based on boosting term nodes that have not been selected in recent iterations are more likely to be selected, and nodes that have been overly selected are de-emphasized throughout the training process.

After the training process has been completed, the one or more layers of the sparse neural network may generate sparse layer outputs by selecting a subset of nodes based on their boosting terms during the inference process. In such an embodiment, a current layer may generate sparse layer outputs by selecting a subset of nodes based on the boosting term of each node, instead of solely considering the values of the intermediate outputs. For example, a subset of nodes having boosting terms above a threshold value or proportion may be selected within each subgroup of nodes to generate a sparse layer output. In one instance, the boosting term for a node during the inference process is determined using the relationship in equation (2), in which the duty cycle of the node is determined at one or more iterations of the training process, such as the last iteration $t_n$ of the training process.

Figure 7:
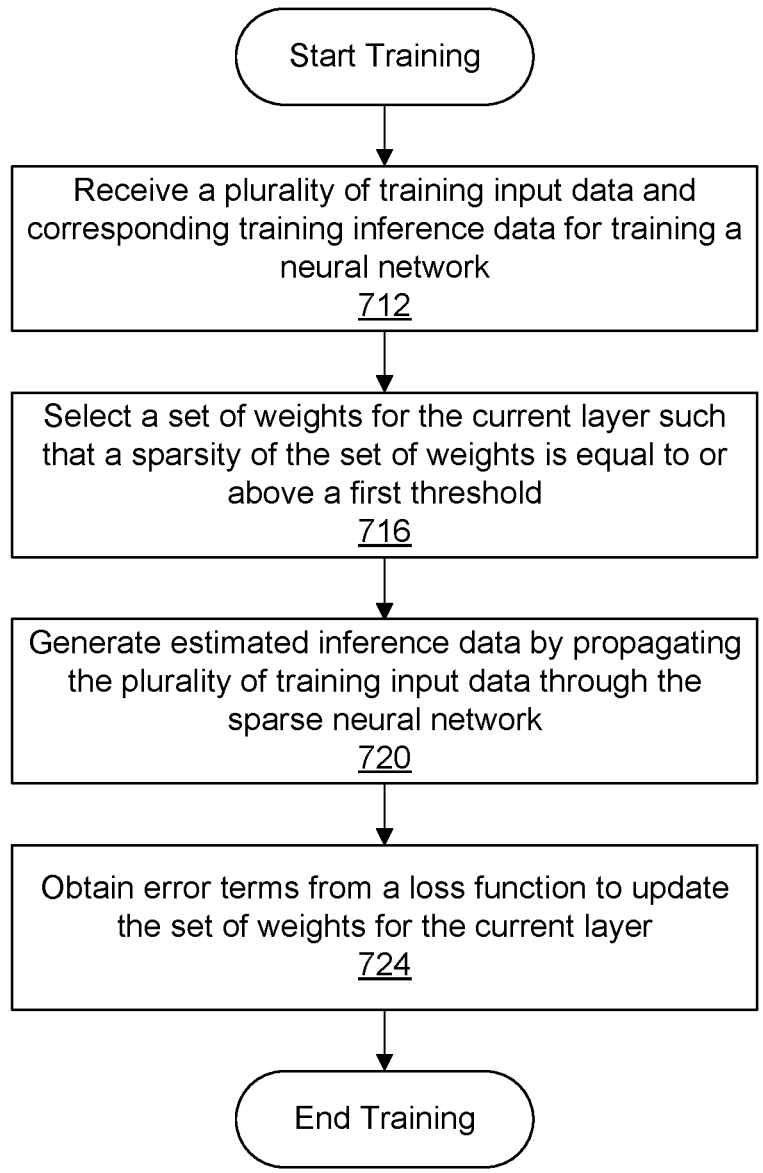
FIG. 7 is a flowchart illustrating a method of training a sparse neural network, according to one embodiment.

FIG. 7 is a flowchart illustrating a method of training a sparse neural network, according to one embodiment. The inference system 104 receives 712 training input data and corresponding training inference data for the training input data for training a neural network including a plurality of layers of nodes including a current layer and a previous layer. A set of weights for the current layer are selected 716 such that a sparsity of the set of weights is equal to or above a first threshold. The selected set of weights represent a subset of possible connections between nodes of the current layer and nodes of a previous layer. For an iteration in one or more training iterations, estimated inference data is generated 720 by propagating the plurality of training input data through the sparse neural network to generate at least an estimated layer output for nodes of the current layers. Error terms are obtained 724 from a loss function to update the set of weights for the current layer. The loss function indicates a difference between the estimated inference data and the training inference data.

In one embodiment, unsupervised learning rules, such as Hebbian learning, that do not explicitly reduce a loss function or do not need an external teacher signal may be used to update the weights for the current layer.

Sparse Convolutional Neural network

Figure 8:
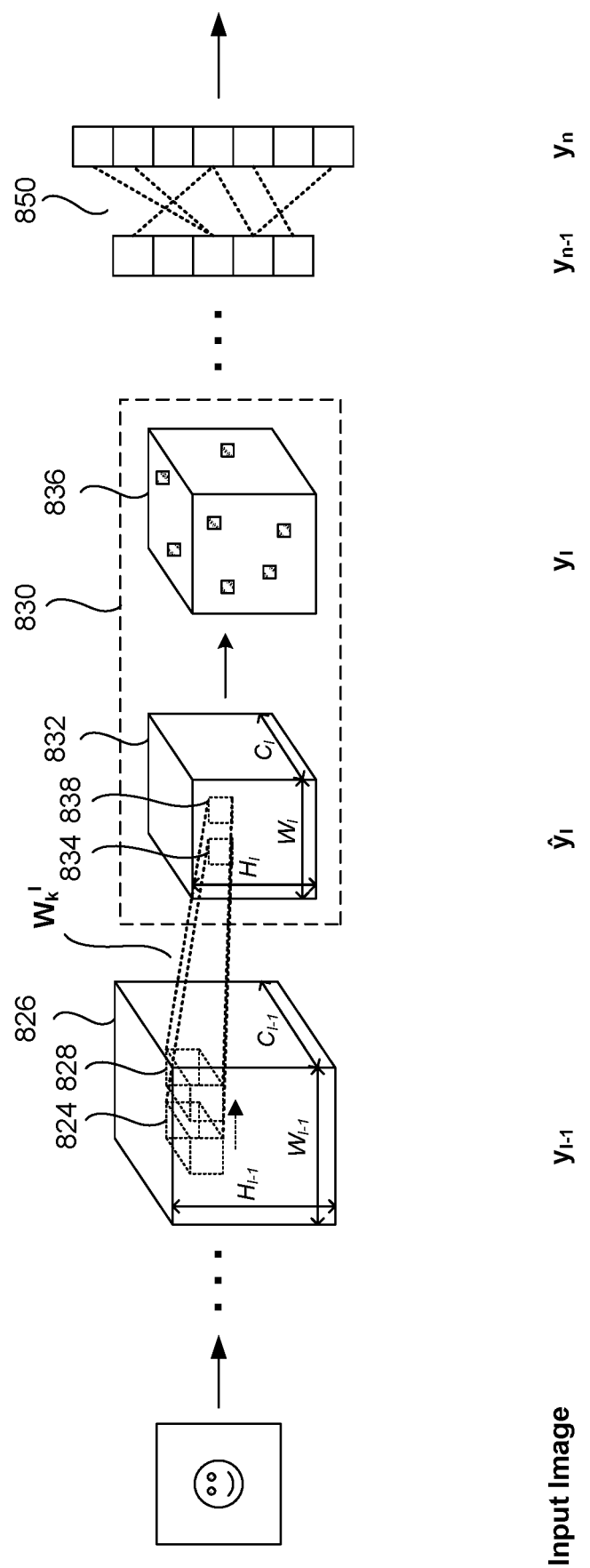
FIG. 8 illustrates a sparse convolutional neural network (CNN) architecture, according to an embodiment.

FIG. 8 illustrates a sparse convolutional neural network (CNN) architecture, according to an embodiment. Compared to a sparse neural network, the sparse CNN architecture described in conjunction with FIG. 8 may additionally include a set of convolutional layers that can be advantageous for processing information in the form of images, videos, sequences of text, and the like. However, the inference process and training process of the sparse CNN architecture may be substantially similar to that described in conjunction with FIGS. 3 through 7.

Specifically, a convolutional layer in the sparse CNN architecture includes a set of nodes arranged as a tensor. The sparse CNN architecture also includes one or more different types of kernels associated with the layer. Each kernel may be associated with a corresponding set of weights. For example, the sparse CNN architecture shown in FIG. 8 includes, among others, l-1-th layer and l-th layer that are convolutional layers. The nodes of the l-1-th layer are arranged as a tensor having width $W_{l-1}$, height $H_{l-1}$, and channel depth $C_{l-1}$. Similarly, the nodes of the l-th layer are arranged as a tensor having width $W_l$, height $H_l$, and channel depth $C_l$. The architecture also includes, among others, a k-th kernel for convolutional layer 830 that is associated with a set of weights $W_k^l$.

During the inference process, a convolutional layer generates intermediate outputs in the form of an intermediate tensor by applying the one or more kernels to the layer output of the previous layer. Specifically, each kernel may be sequentially applied to subsets of nodes in the previous layer to generate intermediate outputs for corresponding subsets of nodes in the convolutional layer. Thus, the set of weights for the kernel represent connections between the subsets of nodes in the previous layer and the corresponding subsets of nodes in the convolutional layer. The kernels for a convolutional layer may differ with respect to their dimensionalities, the frequency to which they are applied across the layer output of the previous layer, and the like.

For example, in the architecture shown in FIG. 8, the convolutional layer 830 may apply the set of weights $W_k^l$ to a subset 824 of nodes in the previous layer to generate intermediate outputs for a corresponding subset 834 of nodes in the convolutional layer. The convolutional layer 830 may apply the same set of weights $W_k^l$ to the next subset of 828 of nodes in the previous layer to generate a corresponding subset 838 of nodes in the convolution layer 830. This process is repeated for subsequent nodes, and other kernels for the convolutional layer may be applied in a similar manner until intermediate outputs $\hat{y}_l$ for all nodes in the convolutional layer have been generated as intermediate tensor 832.

In one instance, the sparse CNN architecture may include kernels having a set of sparse weights for one or more convolutional layers. For example, the set of weights for a kernel may have a sparsity equal to or greater than a first threshold. Thus, the sparsity for a kernel may be determined as the ratio of the number of zero weight values in the kernel to the number of total elements in the kernel, and this ratio may be equal to or greater than a first threshold. During the training process, the inference system 104 may select, for each of one or more kernels, the set of weights such that the sparsity for the selected set of weights is above a first threshold.

The convolutional layer may generate sparse layer outputs in the form of a sparse tensor by selecting a subset of nodes in the intermediate tensor, and zeroing the remaining nodes in the intermediate tensor. For example, a subset of nodes may be selected within the intermediate tensor that have nodes with intermediate outputs or boosting terms above a threshold value or a threshold proportion within the intermediate tensor. For example, in the architecture shown in FIG. 8, the convolutional layer 830 further generates the sparse tensor 836 by selecting a subset of nodes in the intermediate tensor 832 having intermediate outputs $\hat{y}_l$ or boosting terms above a threshold value, as shown by the nodes with striped patterns, and zeroing the remaining subset of nodes.

Figure 9A:
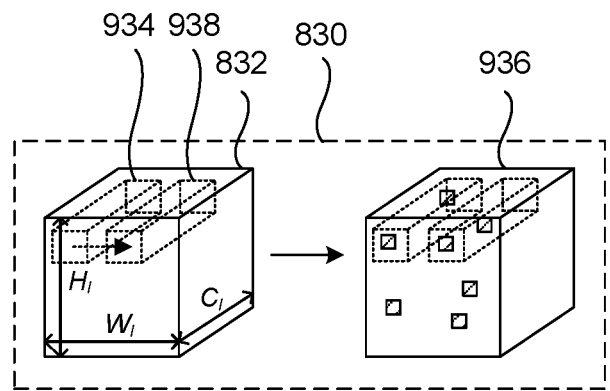
FIGS. 9A and 9B illustrate generating sparse tensors in a convolutional layer, according to an embodiment.
Figure 9B:
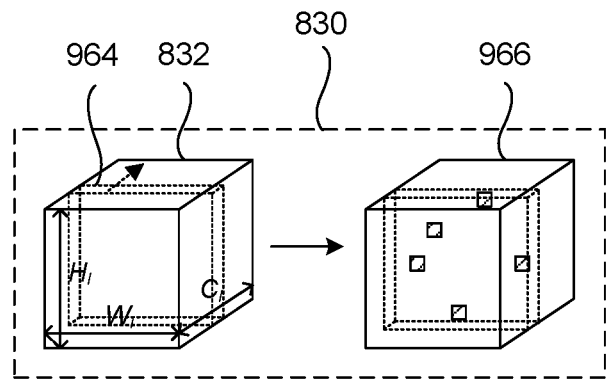

FIGS. 9A and 9B illustrate generating sparse tensors in a convolutional layer, according to an embodiment. In other embodiments, the sparse tensor may be generated by selecting the subset of nodes within each different subgroups of nodes in the intermediate tensor. In one instance, the subgroups of nodes are volumes of nodes within the intermediate tensor that are associated with a smaller dimensionality than the dimensionality of the intermediate tensor. For example, in the convolutional layer shown in FIG. 9A, a subset of two nodes are selected within each rectangular volume of nodes. As shown by the nodes with striped patterns, two nodes are selected from each example rectangular volume 934 and 938 that have intermediate outputs or boosting terms above a threshold value or threshold proportion.

In another instance, the subgroups of nodes are nodes at different channel depths within the intermediate tensor. For example, in the convolutional layer shown in FIG. 9B, a subset of five nodes are selected within each channel depth of nodes. As shown by the nodes with striped patterns, five nodes are selected from nodes at example channel depth 964 that have intermediate outputs above a threshold value or threshold proportion, and another five nodes may be selected from nodes at subsequent channel depths of the tensor, and so on.

In another instance, one or more layers of the sparse CNN architecture may generate sparse tensors such that the sparsity of each tensor is associated with a fixed number of non-zero values. For example, the convolutional layer may generate a sparse tensor with a fixed number of non-zero values across the channel depth for nodes at a given width and height.

In one embodiment, when the sparse CNN is trained using the boosting term, the inference system 104 determines the boosting term based on channels of the sparse CNN, rather than individual units of a current layer. In one instance, the running average of the duty cycle $d_c^l(t)$ for a channel c in layer l at iteration t is given by:

$$d_c^l(t) = (1 - \alpha) \cdot d_c^l(t-1) + \alpha \cdot \frac{\|y_c^l(t)\|_0}{w^l \cdot h^l} \tag{3}$$

where $d_c^l(t-1)$ is the duty cycle of the channel at a previous iteration t−1, $\|y_c^l(t)\|_0$ indicates the number of selected nodes within the channel, $w^l$ indicates the width of the tensor and hl indicates the height of the tensor for layer l, and $\alpha$ is a parameter that balances the relative contribution of the intermediate output for the channel and the previous duty cycle for the channel to the boosting term. The boosting term $b_c^l(t)$ for channel c in layer l at iteration t is given by:

$$b_c^l(t) = e^{\beta \left(a^l - d_c^l(t)\right)} \tag{4}$$

where $a^l$ is the target duty cycle given by $k/C^l$ where $C^l$ is the number of channels in layer l, and $\beta$ is a parameter controlling the strength of the boosting.

Experimental Results for Dense and Sparse Neural Networks

FIG. 10 illustrates sparsity characteristics for weights and layer outputs of a set of example neural networks. FIG. 11 illustrates experimental performance metrics of the example neural networks. Specifically, each example architecture includes three layers, L1, L2, and L3. The column "L1 Nodes" indicates the number of nodes in the first layer L1, the column "L1 Sparsity" indicates the sparsity of the layer outputs at the first layer L1, the column "L1 Weight Sparsity" indicates the sparsity of a set of weights representing connections between the first layer L1 and the input layer, the column "L2 Nodes" indicates the number of nodes in the second layer L2, the column "L2 Output Sparsity" indicates the sparsity of the layer outputs at the second layer L2, the column "L2 Weight Sparsity" indicates the sparsity of a set of weights representing connections between the second layer L2 and the first layer L1, the column "L3 Nodes" indicates the number of nodes in the third layer L3, the column "L3 Output Sparsity" indicates the sparsity of the layer outputs at the third layer L3, and the column "L3 Weight Sparsity" indicates the sparsity of the set of weights representing connections between the third layer L3 and the second layer L2.

In Table 2, the column "Test Score" indicates the accuracy of the inference data of an example neural network on test data, the column "Noise Score" indicates the total number of correctly classified inputs for all test inputs that have noise added to it, the column "Noise Accuracy" indicates the average accuracy of the inference data of an example neural network in which additive noise is added to the test data, the column "Non-zero Parameters" indicates the number of non-zero weights at nodes in the example neural network.

As indicated in Table 2, the example neural network "denseCNN2" having the highest number of non-zero parameters at 1,717,140, is associated with a noise score and noise accuracy that is significantly lower than that of the remaining subset of sparse neural networks. This indicates that sparse neural networks have improved robustness to noise compared to relative dense architectures, while maintaining similar or greater accuracy than dense architectures.

Figure 12:
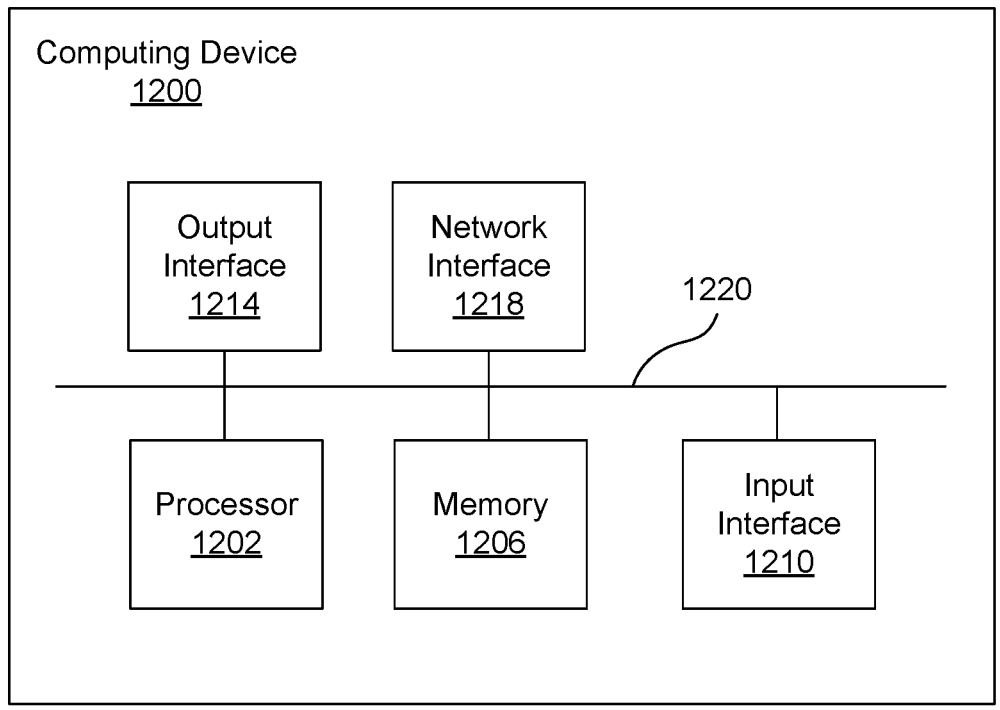
FIG. 12 is a block diagram of a computing device for implementing inference systems according to embodiments.

FIG. 12 is a block diagram of a computing device 1200 for implementing inference systems according to embodiments. The computing device 1200 may include, among other components, a processor 1202, a memory 1206, an input interface 1210, an output interface 1214, a network interface 1218, and a bus 1220 connecting these components. The processor 1202 retrieves and executes commands stored in memory 1206. The memory 1206 store software components including, for example, operating systems and modules for instantiating and executing nodes as described herein. The input interface 1210 receives data from external sources such as sensor data or action information. The output interface 1214 is a component for providing the result of computation in various forms (e.g., image or audio signals). The network interface 1218 enables the computing device 1200 to communicate with other computing devices by a network. When multiple nodes or components of a single node is embodied in multiple computing devices, information associated with temporal sequencing, spatial pooling and management of nodes may be communicated between computing devices via the network interface 1218.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method, comprising:
   receiving input data by a trained neural network including a plurality of layers of nodes including a current layer and a previous layer;
   generating a layer output of the previous layer based at least on the input data;
   applying, to the layer output of the previous layer, a set of weights that represent connections between nodes of the current layer and nodes of the previous layer;
   generating intermediate outputs for the current layer by applying the set of weights for the current layer to a layer output of the previous layer, wherein a sparsity of the set of weights is equal to or above a first threshold;
   selecting a subset of nodes for the current layer based on one or more criteria; and
   generating a layer output for nodes of the current layer by retaining values of the selected subset of the layer output of the current layer and zeroing unselected nodes of the layer output of the current layer so that the layer output of the current layer has a sparsity equal to or above a second threshold.

2. The method of claim 1, wherein the selected subset of nodes are nodes having intermediate outputs above a threshold value or within a threshold proportion of nodes in the current layer.

3. The method of claim 1, wherein another layer in the plurality of layers is associated with another set of weights that have a same number of non-zero weights as the set of weights for the current layer.

4. The method of claim 1, wherein the neural network is a convolutional neural network (CNN) architecture, and wherein the intermediate outputs of the current layer are arranged as an intermediate tensor having a first width, a first height, and a first channel depth, and wherein the layer output of the current layer are arranged as a sparse tensor.

5. The method of claim 4, wherein the selected subset of nodes are nodes with intermediate outputs above a threshold value or within a threshold proportion of a volume of nodes within the intermediate output, the volume of nodes having a second width smaller than the first width, a second height smaller than the first height, and a second channel depth smaller than the first channel depth.

6. The method of claim 1, wherein the selected subset of nodes are nodes with intermediate outputs above a threshold value or within a threshold proportion of a subgroup of nodes at a particular channel depth position of the intermediate tensor.

7. A method, comprising:
   receiving a plurality of training input data and corresponding training inference data for the training input data for training a neural network including a plurality of layers of nodes including a current layer and a previous layer;
   selecting a set of weights for the current layer such that a sparsity of the set of weights is equal to or above a first threshold, the set of weights representing a subset of possible connections between nodes of the current layer and nodes of the previous layer;
   for an iteration in one or more training iterations:
     generating estimated inference data by propagating the plurality of training input data through the plurality of layers of the neural network to generate at least an estimated layer output for nodes of the current layer, the generating comprising:
       generating estimated intermediate outputs for the current layer, selecting a subset of nodes for the current layer based on one or more criteria, and
       generating the estimated layer output for the current layer by retaining values of the selected subset of nodes and zeroing unselected nodes of the current layer so that a sparsity of the estimated output for the current layer is equal to or above a second threshold; and
     backpropagating error terms obtained from a loss function to update the set of weights for the current layer, wherein the loss function indicates a difference between the estimated inference data and the training inference data.

8. The method of claim 7, wherein the set of weights for the layer are selected by zeroing weights that represent a remaining subset of potential connections between the nodes of the current layer and the nodes of the previous layer that are not included in the set of potential connections for the selected set of weights.

9. The method of 7, wherein
generating the estimated intermediate outputs for the current layer comprises applying the set of weights for the current layer to an estimated layer output of the previous layer.

10. The method of 9, further comprising:
for each node in the current layer, determining a boosting term for the node that indicates how frequently the node has been selected during previous training iterations.

11. The method of 10, wherein the boosting term increases as a duty cycle for the node decreases, and decreases as the duty cycle for the node increases.

12. The method of 10, further comprising:
determining the boosting term for the node as a combination of a duty cycle that indicates how frequently the node has been selected during the previous training iterations, and whether the estimated intermediate output for the node is above a threshold value or within a threshold proportion of the nodes in the current layer.

13. A non-transitory computer readable storage medium comprising instructions when executed by a processor cause the processor to perform the steps of:
receiving input data by a trained neural network including a plurality of layers of nodes including a current layer and a previous layer;
generating a layer output of the previous layer based at least on the input data;
applying, to the layer output of the previous layer, a set of weights that represent connections between nodes of the current layer and nodes of the previous layer;
generating intermediate outputs for the current layer by applying the set of weights for the current layer to a layer output of the previous layer, wherein a sparsity of the set of weights is equal to or above a first threshold;
selecting a subset of nodes for the current layer based on one or more criteria; and
generating a layer output for nodes of the current layer by retaining values of the selected subset of the layer output of the current layer and zeroing unselected nodes of the layer output of the current layer so that the layer output of the current layer has a sparsity equal to or above a second threshold.

14. The non-transitory computer readable storage medium of claim 13, wherein the selected subset of nodes are nodes having intermediate outputs above a threshold value or within a threshold proportion of nodes in the current layer.

15. The non-transitory computer readable storage medium of claim 13, wherein another layer in the plurality of layers is associated with another set of weights that have a same number of non-zero weights as the set of weights for the current layer.

16. The non-transitory computer readable storage medium of claim 13, wherein the neural network is a convolutional neural network (CNN) architecture, and wherein the intermediate outputs of the current layer are arranged as an intermediate tensor having a first width, a first height, and a first channel depth, and wherein the layer output of the current layer are arranged as a sparse tensor.

17. The non-transitory computer readable storage medium of claim 16, wherein the selected subset of nodes are nodes with intermediate outputs above a threshold value or within a threshold proportion of a volume of nodes within the intermediate output, the volume of nodes having a second width smaller than the first width, a second height smaller than the first height, and a second channel depth smaller than the first channel depth.

18. The non-transitory computer readable storage medium of claim 13, wherein the selected subset of nodes are nodes with intermediate outputs above a threshold value or within a threshold proportion of a subgroup of nodes at a particular channel depth position of the intermediate output.

19. A non-transitory computer readable storage medium comprising instructions when executed by a processor cause the processor to perform the steps of:
receiving a plurality of training input data and corresponding training inference data for the training input data for training a neural network including a plurality of layers of nodes including a current layer and a previous layer;
selecting a set of weights for the current layer such that a sparsity of the set of weights is equal to or above a first threshold, the set of weights representing a subset of possible connections between nodes of the current layer and nodes of the previous layer;
for an iteration in one or more training iterations:
generating estimated inference data by propagating the plurality of training input data through the plurality of layers of the neural network to generate at least an estimated layer output for nodes of the current layer, the generating comprising:
generating estimated intermediate outputs for the current layer, selecting a subset of nodes for the current layer based on one or more criteria, and
generating the estimated layer output for the current layer by retaining values of the selected subset of nodes and zeroing unselected nodes of the current layer so that a sparsity of the estimated output for the current layer is equal to or above a second threshold; and
backpropagating error terms obtained from a loss function to update the set of weights for the current layer, wherein the loss function indicates a difference between the estimated inference data and the training inference data.

20. The non-transitory computer readable storage medium of claim 19, wherein the set of weights for the layer are selected by zeroing weights that represent a remaining subset of potential connections between the nodes of the current layer and the nodes of the previous layer that are not included in the set of potential connections for the selected set of weights.

21. The non-transitory computer readable storage medium of claim 19, wherein
generating the estimated intermediate outputs for the current layer comprises applying the set of weights for the current layer to an estimated layer output of the previous layer.

22. The non-transitory computer readable storage medium of claim 21, wherein the instructions further comprise:
for each node in the current layer, determining a boosting term for the node that indicates how frequently the node has been selected during previous training iterations.

23. The non-transitory computer readable storage medium of claim 22, wherein the boosting term increases as a duty cycle for the node decreases, and decreases as the duty cycle for the node increases.

24. The non-transitory computer readable storage medium of claim 22, wherein the instructions further comprise:
determining the boosting term for the node as a combination of a duty cycle that indicates how frequently the node has been selected during the previous training iterations, and whether the estimated intermediate output for the node is above a threshold value or within a threshold proportion of the nodes in the current layer.

* * * * *